United States Patent

Shibatani et al.

(10) Patent No.: US 7,538,795 B2
(45) Date of Patent: May 26, 2009

(54) MONITOR DEVICE FOR MOVING BODY

(75) Inventors: Kazuhiro Shibatani, Sakai (JP);
Tetsuya Katagiri, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 592 days.

(21) Appl. No.: 10/617,761

(22) Filed: Jul. 14, 2003

(65) Prior Publication Data

US 2004/0189831 A1    Sep. 30, 2004

(30) Foreign Application Priority Data

Mar. 25, 2003    (JP)    ............... 2003-082148

(51) Int. Cl.
*H04N 5/228*    (2006.01)
(52) U.S. Cl. .............. 348/208.16; 348/208.6; 348/222.1; 348/208.14; 348/211.9
(58) Field of Classification Search ............ 348/207.99, 348/222.1, 211.8, 211.9, 208.16, 155, 169, 348/208.6, 208.14
See application file for complete search history.

(56) References Cited

U.S. PATENT DOCUMENTS

| | | | | |
|---|---|---|---|---|
| 5,734,337 | A * | 3/1998 | Kupersmit | 348/148 |
| 5,742,699 | A * | 4/1998 | Adkins et al. | 348/137 |
| 6,311,123 | B1 * | 10/2001 | Nakamura et al. | 701/96 |
| 6,681,195 | B1 * | 1/2004 | Poland et al. | 702/142 |
| 6,828,994 | B2 * | 12/2004 | Oka et al. | 715/858 |

FOREIGN PATENT DOCUMENTS

| | | |
|---|---|---|
| JP | 05-232208 | 9/1993 |
| JP | 07-105481 | 4/1995 |
| JP | 07105481 | * 4/1995 |
| JP | 08-275042 | 10/1996 |
| JP | 09-202180 | 8/1997 |

(Continued)

OTHER PUBLICATIONS

Yoshikarzu Suematu et al., "A Wide Angle Vision Sensor with Fovea Design of Distortion Lens and the Simulated Images," Department of Mechanical Engineering. Nagoya University. pp. 1-4.

(Continued)

*Primary Examiner*—Lin Ye
*Assistant Examiner*—Gevell Selby
(74) *Attorney, Agent, or Firm*—McDermott Will & Emery LLP

(57) ABSTRACT

Disclosed is a monitor device for a moving body such as a vehicle, aircraft or vessel, moving at a certain speed. The monitor device displays an image of a front scene of the moving body with the image of the central area being enlarged in accordance with the running speed of the moving body such that condition of a far away portion can be recognized accurately. A zoom ratio calculating section determines a zoom ratio in accordance with running speed of the moving body. The area of image to be displayed is selected in accordance with the zoom ratio and the image of the selected area is displayed on a display screen in an enlarged form. A specially designed distortion lens may be used to take the picture of the front scene to form an image of the scene with its central area being optically enlarged.

15 Claims, 16 Drawing Sheets

FOREIGN PATENT DOCUMENTS

| | | | |
|---|---|---|---|
| JP | 09202180 | * | 8/1997 |
| JP | P3084208 | | 6/2000 |
| JP | P3229687 | | 9/2001 |
| JP | 2002-016832 A | | 1/2002 |

OTHER PUBLICATIONS

Yoshikazu Suematu et al., "An Advanced Vision Sensor with Fovea (Design of Distortion lens)." Department of Mechanical Engineering. Nagoya University. pp. 1-4.

* cited by examiner

CHARACTERISTICS OF FOVEA LENS

MONITOR DEVICE FOR MOVING BODY

This application is based on patent application No. 2003-082148 filed in Japan, the contents of which are hereby incorporated by references.

BACKGROUND OF THE INVENTION AND RELATED ART

The present invention relates to a monitor device for displaying a front scene of a manned or unmanned moving body running at certain speed. The moving body may be a vehicle or vessel including, although not limited thereto, an automobile, a train, a tram car, a ship, a boat, an aircraft and a roller coaster. The moving body may include a radio-controlled toy plane, motor car and boat.

In such a moving body, it is important to monitor the front scene of the moving body and observe the condition of its running path in order to control the moving body or avoid accident in advance. When a picture of the front scene is taken by a standard lens or fixed focus lens, the image of the far away scene is so small that it is difficult to recognize the condition of the far way scene certainly.

Monitor devices for automobiles have been proposed which take pictures and display images of the lane where the automobile is running, and its surrounding scene. One of the monitor devices disclosed in a Japanese patent No. 3229687, is arranged to take picture of lines on both sides of a traffic lane through a zoom lens with the objective lens being zoomed at a speed higher than the shutter speed such that it is easily and accurately recognized whether the lane is straight or curved at a distance.

This prior art device is useful for the driver to recognize the lane condition at distance, but requires optical zooming mechanism, resulting in increase of mechanical parts. Accordingly, the conventional device has disadvantage in its durability, cost and compactness.

Another monitor device or an image processing device disclosed in a Japanese patent No. 3084208 displays an image of front scene of an automobile, with the image being enlarged by digital zooming such that the zoom ratio is large for a far away scene while the zoom ratio being small for nearby scene. This prior art is designed such that an image of traffic lane lines is detected and the image of the far-away front scene is enlarged in a horizontal direction at a fixed zooming ratio irrespectively of the speed of the automobile. Thus, it will be difficult for the driver to recognize the condition of the far away scene when the automobile is running at high speed.

SUMMARY OF THE INVENTION

Accordingly, an object of the present invention is to provide a monitor device for a moving body which displays an image of a front scene of the moving body with an image of a far away scene being enlarged.

Another object of the present invention is to provide a monitor device for a moving body with which a far way front scene of the moving body can be recognized easily and certainly.

Still another object of the present invention is to provide a monitor device for a moving body which displays an image of a front scene of the moving body with an image of a far away scene being enlarged while a wide angle of view being ensured.

Yet another object of the present invention is to provide a monitor device for a moving body with which the area of a displayed image to be enlarged is changed in accordance with the speed of the moving body.

To attain one or more of the objects, a monitor device for displaying a front scene of a moving body comprises an image forming section for forming a two dimensional image of the front scene; an image sensor for photo-electrically converting the two dimensional image into electric image data; a speed sensor for detecting running speed of the moving body; a zoom ratio determining section for determining a zoom ratio in accordance with the detected running speed; an image area selecting section for processing the image data to select, in accordance with the determined zoom ratio, an area of the image formed by the image forming section; an image enlarging section for processing the image data processed by the image area selecting section to enlarge the image of the selected area with the zoom ratio determined by the zoom ratio determining section; and a display for displaying the image of the area enlarged by the image enlarging section According to another aspect of the present invention, a monitor device for displaying a front scene of a moving body comprises an image forming section for forming a two dimensional image of the front scene; an image sensor for photo-electrically converting the two dimensional image into electric image data; a speed sensor for detecting running speed of the moving body; a zoom ratio determining section for determining a zoom ratio in accordance with the detected running speed; an image sensor driving section for driving the image sensor to change the photo-electrically converted area of the two dimensional image in accordance with the determined zoom ratio; an image enlarging section for processing the image data to enlarge the image of the converted area with the zoom ratio determined by the zoom ratio determining section; and a display for displaying the image of the area enlarged by the image enlarging section.

According to an aspect of an embodiment of the present invention, the image forming section includes a specially designed distortion lens for taking a picture of the front scene to form an image of the scene with its central area being optically enlarged.

The above and further objects and novel features of the invention will more fully appear from the following detailed description wherein the same is read in connection with the accompanying drawing. It is to be expressly understood, however, that the drawing is for purpose of illustration only and is not intended as a definition of the limits of the invention.

DETAILED DESCRIPTION OF PREFERRED EMBODIMENTS

In the followings, description is made about various embodiments of the present invention with reference to the cases where the present invention is applied to an automobile. However, the application of the invention is not limited to the automobile but the invention may be applied to various types of moving bodies such as automobiles, trains, tram cars, air crafts, ships, boats, roller coasters, and so forth. The moving body may be manned or unmanned.

Figure 1:
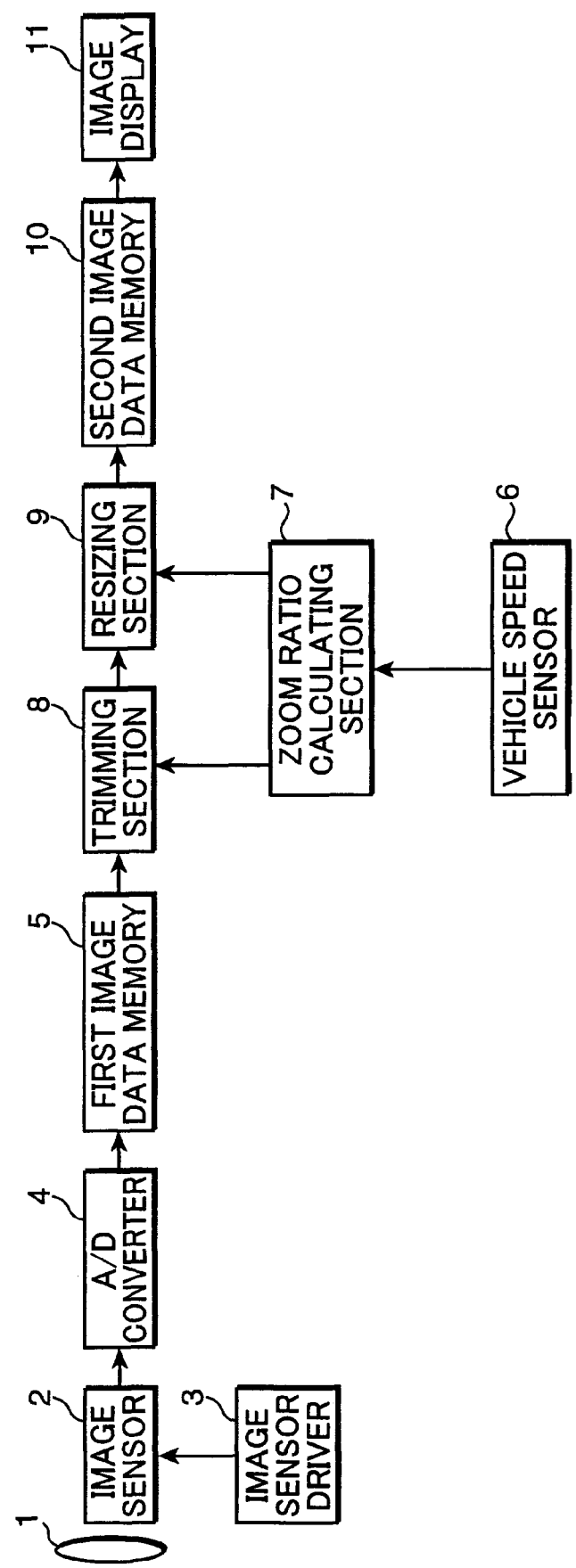
FIG. 1 is a block diagram showing a composition of a picture-taking device according to a first embodiment of the present invention.

Explanation will be made about a picture taking device according to a first embodiment of the present invention with reference to FIG. 1 which is a block diagram showing the composition of the embodiment. As seen in FIG. 1, the picture taking device is composed of an image forming section 1, an image sensor 2, an image sensor driver 3, A/D converter 4, a first image data memory 5, a vehicle speed sensor 6, zoom ratio calculating section 7, a trimming section 8, resizing section 9, a second image data memory 10 and an image display 11. In the present embodiment, the picture taking device is equipped in an automobile to continuously monitor a scene in front of the automobile, i.e. the scene in the direction in which the automobile is advancing at a certain speed. For the continuous monitoring, the picture taking device functions as a motion picture video camera. Instead of the continuous monitoring, the picture taking device may functions as digital still camera which takes the picture of the scene at a given interval.

The image forming section includes a fixed focus objective lens having a fixed focal length and a fixed angle of view, and forms an image of the front scene on an image plane of the image sensor 2 arranged behind the image forming section. The image forming section is arranged to take a picture of the front scene, with the image of an actual or imaginary converging point of the lane of the running path for the automobile being at the center of the image frame.

The image sensor 2 includes a CCD color area sensor (referred to as CCD) provided with a rectangular image plane for photo-electrically converting the image formed on the image plane into R (red), G (green) and B (blue) image signals and outputs the image signals as trains of signals corresponding to intensities of the light received by pixels of the CCD.

The image sensor driver 3 drives the image sensor 2 to make the image sensor 2 output the image signals for a predetermined imaging area of the image plane of the image sensor 2.

The A/D converter 4 converts the analog image signals outputted from the image sensor 2, into digital signals, which, in turn, are stored in the first image data memory 5. The vehicle speed sensor 6 detects the speed of the automobile on which the picture taking device is equipped. The vehicle speed sensor 6 outputs speed signals representative of the detected speed and speed signals are supplied to the zoom ratio calculating section 7. The speed sensor 6 may be any of vehicle speed detectors which are well known per se in the art. Instead of providing an independent speed sensor, the zoom ratio calculating section 7 may be arranged to receive output of speed sensor originally equipped in the automobile for indication of vehicle speed to a driver of the automobile.

The zoom ratio calculating section 7 calculates zoom ratio in accordance with the vehicle speed detected by the vehicle speed sensor 6. The zoom ratio is a ratio of magnification with which the image of the scene is magnified or enlarged. When the vehicle speed is within a first range e.g. from 60 km/h to 80 km/h at which the driver of the automobile can recognize the state of the remote or far-away running path by naked eye, the zoom ratio calculating section 7 calculates a first zoom ratio for magnifying the image to be displayed on the image display 11. When the vehicle speed is within a second range e.g. from 80 km/h to 100 km/h at which it is difficult for the driver of the automobile to recognize the state of the remote or far-away running path by naked eye, the zoom ratio calculating section 7 calculates a second zoom ratio for magnifying the image to be displayed on the image display 11.

The trimming section 8 processes the image data received from the first image data memory 5 to trim or cut out a portion of the area P of the image taken by the image sensor 2, and selects a smaller area in accordance with the zoom ratio calculated by the zoom ratio calculating section 7. The trimming section 8 selects a first area P2 (see FIG. 2) of the image when the zoom ratio calculated by the zoom ratio calculating section 7 is within the first range. The trimming section 8 selects a second area P3 of the image(see FIG. 2) which is smaller than the first area when the zoom ratio calculated by the zoom ratio calculating section 7 is within the second range.

The resizing section 9 processes the image data received from the trimming section 8 to enlarge the selected first or second area of the image to a full size, with the magnification or enlargement being made radially with reference to the center of the image, for example, the crossing point of diagonal lines of a square image area where the image of the lane of the running path converges. That is, the image of the selected area is magnified or enlarged towards its periphery with its central image remaining at the center. The central image represents distant or far-away condition of the driving lane.

When the trimming section 8 selects the fist area P1, the resizing section 9 enlarges or resizes the image of the selected area P1 to a size fully displayed on the entire screen of the image display 11. When the trimming section 8 selects the second area P2, the resizing section 9 enlarges or resizes the image of the selected area P2 to a size fully displayed on the entire screen of the image display 11.

The second image data memory 10 stores the image data of the image resized and enlarged by the resizing section 9. The image display 11 read out the image data stored in the second image data memory 10 and displays an image in accordance with the read-out data. A monitor for automobile navigation system may be used as the image display. Otherwise, the image display 11 may take a form of a head-up display provided on a windshield of the automobile.

Figure 2:
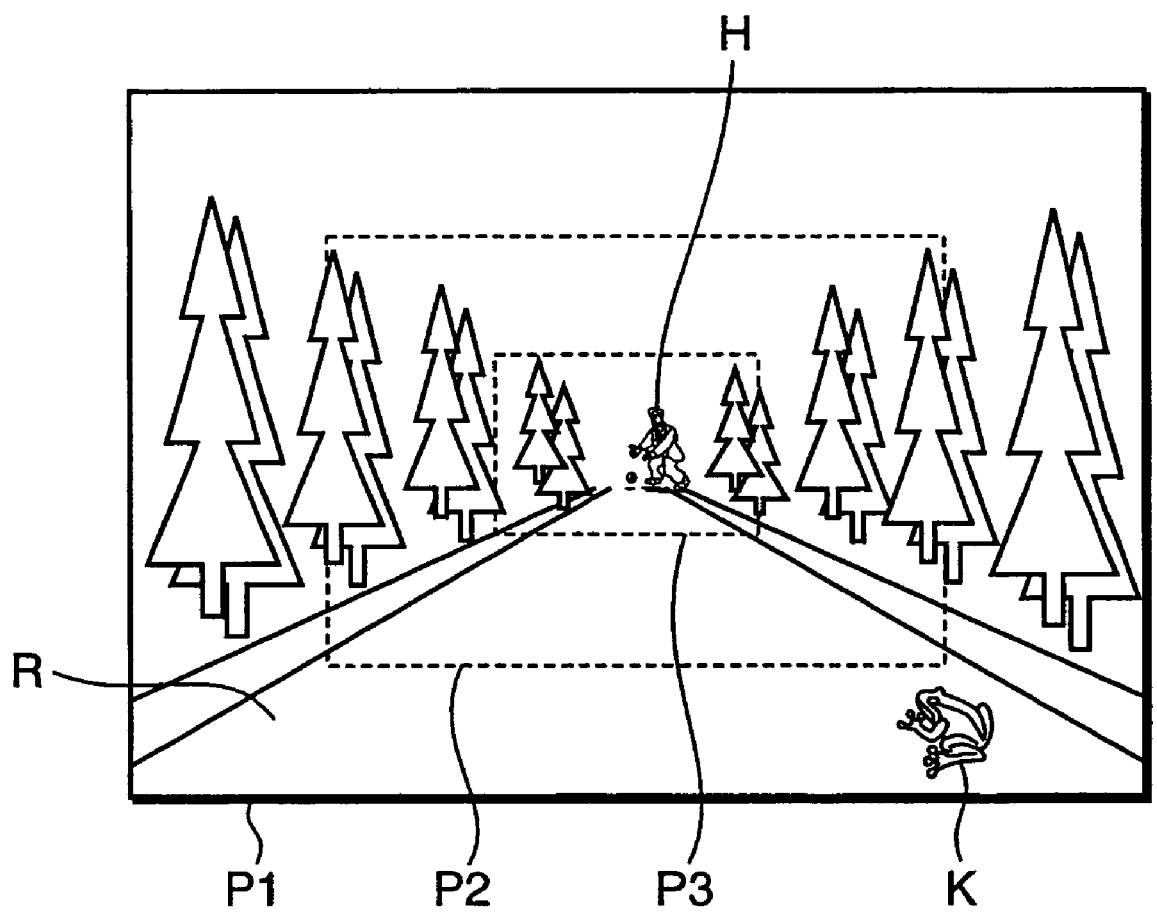
FIG. 2 schematically illustrates an example of a picture taken through a fixed focus lens.

FIG. 2 shows an example of an image of a picture taken through a fixed-focus objective lens. With reference to FIG. 2, the image in the area P1 shows the entire image detected and photo-electrically converted into image signals by the image sensor 2. The area P2 is the area to be selected when the automobile is within the first range of speed, while the area P3 is the area to be selected when the automobile is within the second range of speed. In the image shown in FIG. 2, an unexpected object H such as a person on the running path or driving lane exists in a distant or far-away portion ahead of the automobile. As seen in FIG. 2, the remote object H is displayed in a smaller size or with less image magnification ratio than a near object K as the picture is taken through the fixed focus objective lens.

When the running speed of the automobile detected by the vehicle speed sensor 6 is within the first range and the zoom ratio calculated by the zoom ratio calculating section 7 is the first zoom ratio, the trimming section 8 selects the first image area P2 by trimming. The image of the first area selected by the trimming section 8 is enlarged by the resizing section 9 to be displayed in the entire screen of the image display 11. When the running speed of the automobile detected by the vehicle speed sensor 6 is within the second range and the zoom ratio calculated by the zoom ratio calculating section 7 is the second zoom ratio, the trimming section 8 selects the second image area P2 by trimming. The image of the second area selected by the trimming section 8 is enlarged by the resizing section 9 to be displayed in the entire screen of the image display 11.

Next, explanation will be made about the operation of the picture taking device according to the first embodiment with reference to FIG. 3 which is a flow chart showing the operation.

At Step S1, the image forming section 1 forms, on the image plane of the image sensor 2, an image of an object scene existing in front of the automobile i.e. in the direction in which the automobile is moving, and the image sensor 2 detects the image and photo-electrically converts it into analogue image signals which, in turn, are converted into digital signals by A/D converter. The digital image signals are outputted to the first image data memory 5 to be temporary stored therein. (Step 2) At Step 3, the vehicle speed sensor 6 detects the speed of the automobile. The data of the detected speed is fed to the zoom ratio calculating section 7.

At Step S4, the zoom ratio calculating section 7 calculates a zoom ratio in accordance with the data of the detected speed. The zoom ratio calculating section 7 determines the first zoom ratio when the detected speed is within the first range e.g. from 60 km/h to 80 km/h. When the detected speed is within the second range e.g. from 80 km/h to 100 km/h, the zoom ratio calculating section 7 determines the second zoom ratio which is larger than the first zoom ratio. The data of the determined zoom ratio is outputted to the trimming section 8.

At Step S5, in accordance with the determined zoom ratio, the trimming section 8 selects the range of the image for which the image data are read out to trim the image. When the first zoom ratio is determined by the zoom ratio calculating section 7, the trimming section 8 selects the first range and derives the image data of the selected range to trim the image to be displayed on the image display 11. When the second zoom ratio is determined by the zoom ratio calculating section 7, the trimming section 8 selects the second range and derives the image data of the selected range to display the image such that the image of the remote scene is magnified more greatly. This is because the automobile runs at higher speed when the second zoom ratio is determined than when the first zoom ratio is determined.

At Step S6, the resizing section 9 enlarges the trimmed image to display the image in the entire screen of the image display 11. When the first range is selected, the image of the selected first range is enlarged with a magnification ratio in accordance with the size of the first range and the size of the display screen so that the image in the first range is displayed in the entire screen of the image display 11. When the second range is selected, the image of the selected second range is enlarged with a magnification ratio in accordance with the size of the second range and the size of the display screen so that the image in the second range is displayed in the entire screen of the image display 11. The image data of the enlarged image is outputted to the second image data memory 10 to be stored therein. (Step S7) At Step S8, the image display 11 displays on a display screen, an image according to the image data stored in the second data memory.

The afore-mentioned process from S1 through S7 is conducted for each frame or every several frames of picture taking. When the process at Step S7 is completed, the flow returns to Step S1 and steps following thereto are conducted.

According to the embodiment as mentioned above, the zoom ratio is determined in accordance with the detected speed of the automobile, and a predetermined area of the image taken by the image forming section 1 and the image sensor 2 is selected in accordance with the determined zoom ratio. The selected area of the image is displayed on the screen of image display 11 in a form enlarged in accordance with the sizes of the screen and the selected area such that the image in the selected area is displayed in the entire area of the screen. Accordingly the driver of the automobile can recognize the state of the front scene by looking at the enlarged display of the scene, and may avoid traffic accident beforehand. Especially, as the automobile runs at a higher speed, the zoom ratio is higher, thereby enabling the driver to recognize the state of the remote scene in the direction in which the automobile is moving.

In the embodiment mentioned above, the zoom ratio calculating section 7 determines the first zoom ratio when the speed of the automobile is within the first range, while the zoom ratio calculating section 7 determines the second zoom ratio when the speed of the automobile is within the second range. The present invention is not limited to that but may be modified in various ways. For example, the picture taking device may be provided with a memory which stores a data of a look-up table for determining zoom ratios respectively corresponding to vehicle speeds such that a zoom ratio is determined by the look-up table in accordance with a vehicle speed detected by the vehicle speed sensor. In another modification, the zoom ratio may be calculated using a particular formula for the calculation of a zoom speed from a detected vehicle speed.

In the embodiment mentioned above, the first speed range is from 60 km/h to 80 Km/h and the second sped range is from 80 Km/h to 100 Km/h. The value of the vehicle speed is not limited to that, but may varies as the case may be so far as the speed of the second range is higher than that of the first range. For example, the first speed range may be from 30 Km/h to 80 Km/h and the second speed range may be from 80 Km/h to 130 Km/h.

When the speed of the automobile does not reach the lower limit of the first range (for example, when the speed is lower than 60 Km/h), the image of the front scene taken by the image sensor 6 may be displayed without being magnified. This is because the driver can stop the automobile safely at such speed before reaching a remote object and avoid accident even if it is difficult for the driver to recognize the remote object in the display or by observing the object by naked eyes.

Second Embodiment

Figure 4:
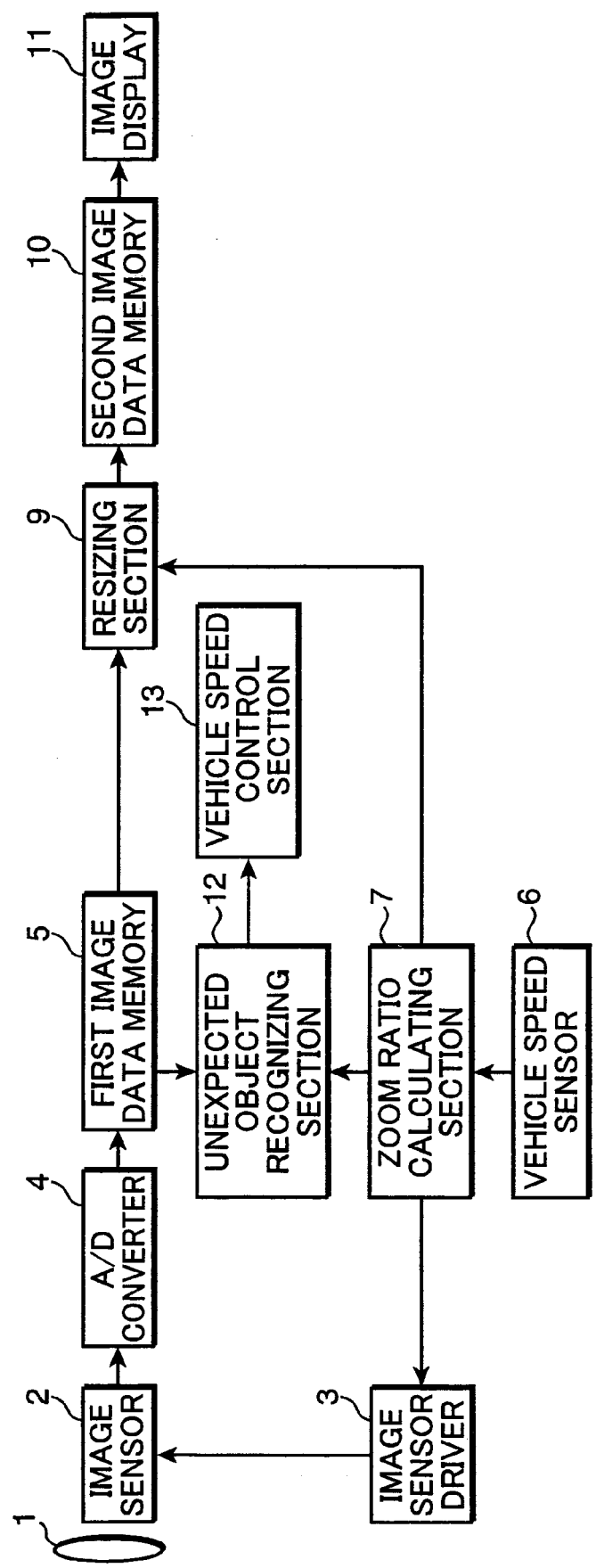
FIG. 4 is a block diagram showing a composition of a picture-taking device according to a second embodiment of the present invention
Figure 5:
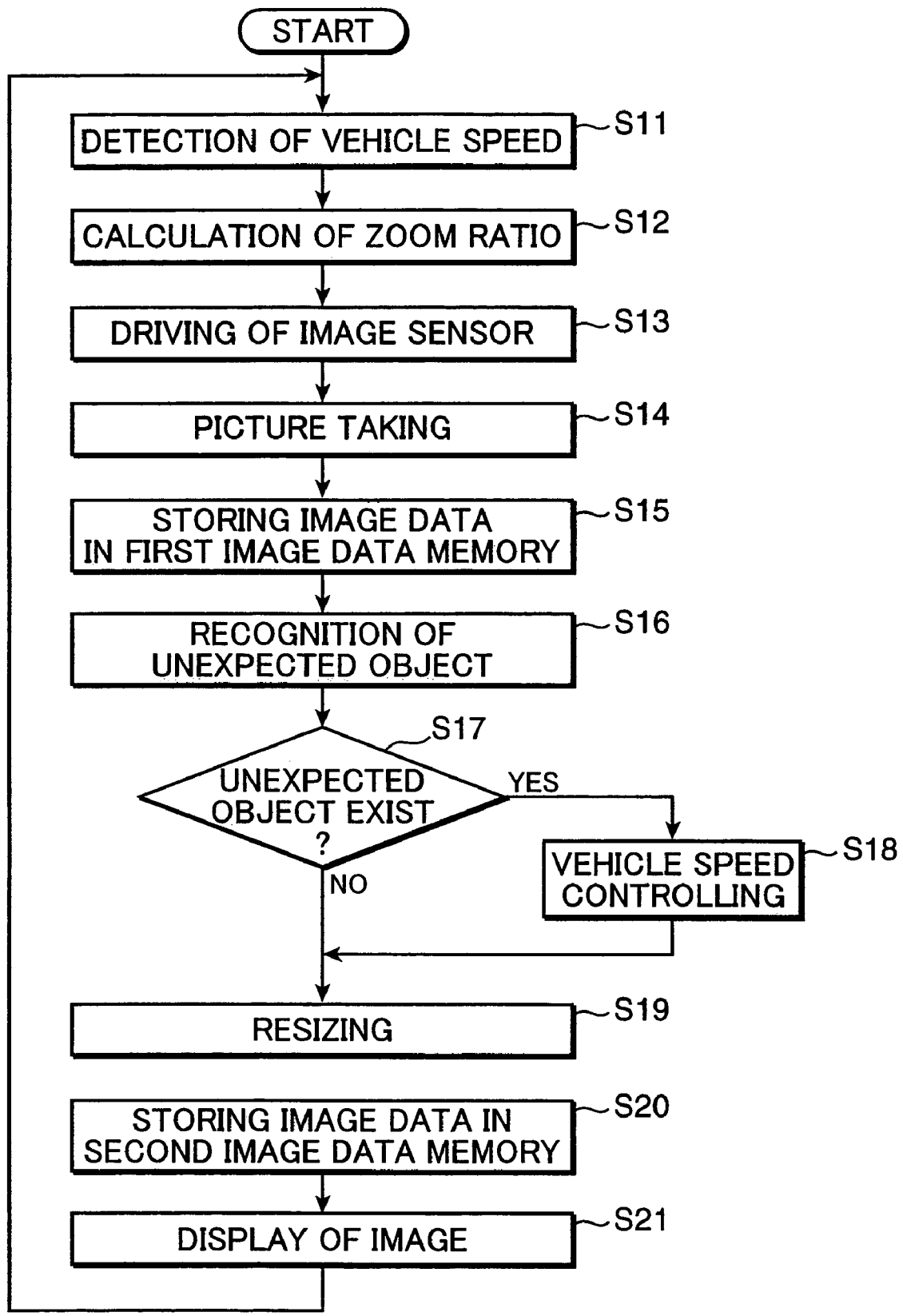
FIG. 5 is a flow chart showing an exemplary operation of the picture-taking device shown in FIG. 4.

Explanation will be made about a picture taking device according to a second embodiment of the present invention with reference to FIGS. 4 and 5. Figure is a block diagram showing the composition of the second embodiment. FIG. 5 is a flow chart showing an exemplary operation of the picture-taking device shown in FIG. 4. As seen in FIG. 4, the picture taking device is composed of an image forming section 1, an image sensor 2, an image sensor driver 3, A/D converter 4, a first image data memory 5, a vehicle speed sensor 6, a zoom ratio calculating section 7, a resizing section 9, a second image data memory 10, an image display 11, an unexpected object recognizing section 12 and a vehicle speed control section 13.

The picture taking device according to the second embodiment is substantially the same in composition as the first embodiment but modified in some points. Accordingly, the second embodiment will be described, with the portions of the second embodiment different from the first embodiment being focused. In FIGS. 4 and 5, the same or like reference numerals are used for the parts or components which are the same or correspond to the parts or members shown in FIGS. 1 through 3.

Receiving data of a zoom ratio from the zoom ratio calculating section, the image sensor driver 3 drives the image sensor 2 to make the latter output image data of the area of an image determined in accordance with the zoom ratio determined by the zoom ratio calculating section 7. When the zoom ratio determined by the zoom ratio calculating section 7 is the first zoom ratio, the image sensor driver 3 drives the image sensor 2 to make the latter output image data of the first area P2. When the zoom ratio determined by the zoom ratio calculating section 7 is the second zoom ratio, the image sensor driver 3 drives the image sensor 2 to make the latter output image data of the second area P3. (see FIG. 2)

The unexpected object recognizing section 12 analyses the image data temporally stored in the image data memory 5 to determines whether an image of any unexpected object H (see FIG. 2) is included in the image data at a portion of the image data corresponding to the central portion of the image, i.e. in a remote scene on the running path. The unexpected object recognizing section 12 may utilize conventional image processing technology. The unexpected object may be detected as an image which increases in size or moves while other images do not change or are changing in a predetermined pattern. The movement of the image may be detected by detecting an edge an image or boundary of images and detecting the change of the edge or boundary per time.

When the unexpected object recognizing section 12 recognizes the existence of an unexpected object, the vehicle speed control section 13 decreases the running speed of the automobile to a predetermined speed e.g. 30 Km/h at which the driver can safely stop the automobile.

Next, explanation will be made about the operation of the picture taking device of the second embodiment with reference to FIG. 5 which is a flow chart showing the operation.

At Step S11, the vehicle speed sensor 6 detects speed of the automobile and the data of the detected speed is outputted to the zoom ratio calculating section 7.

At Step S12, the zoom ratio calculating section 7 determines a zoom ratio in accordance with the detected speed of the automobile. Specifically, when the detected speed is within a first range e.g. from 60 Km/h to 80 Km/h, the zoom ratio calculating section 7 determines a first zoom ratio. When the detected speed is within a second range e.g. from 80 Km/h to 100 Km/h, the zoom ratio calculating section 7 determines a second zoom ratio which is larger in value than the first zoom ratio. The zoom ratio calculating section 7 outputs data of the determined zoom ratio to the image sensor driver 3.

At Step S13, the image sensor driver 3 drives the image sensor 2 to output data of image for an area determined in accordance with the zoom ratio determined by the zoom ratio calculating section 7. Specifically, when the first zoom ratio is determined by the zoom ratio calculating section 7, the image sensor 2 is driven to output data of the image of the first area P2. (see FIG. 2) When the second zoom ratio is determined by the zoom ratio calculating section 7, the image sensor 2 is driven to output data of the image of the second area P3 to display the image with the image of the remote scene being further magnified, since the automobile is running at higher speed at that time.

At Step S14, the image sensor 2 photo-electrically converts the image of the selected area into analog electric signals, which are fed to the A/D converter 4. The A/D converter convert the analog signals into digital signals, which is outputted to the first image data memory 5 to be temporally stored therein at Step S15.

At Step S16, the unexpected object recognizing section 12 determines whether or not data of an image of any unexpected object exist in the image data stored in the first image data memory 5. When it is determined that data of an image of any unexpected object exist, (Yes at Step 17), the flow proceeds to Step S18, while the flow proceeds to Step S19 when it is determined that data of an image of any unexpected object does not exist, (No at Step 17).

At Step S18, the vehicle speed control section 13 decreases or decelerates the speed of the automobile to such a value at which the driver can stop the automobile safely before it reaches the unexpected object.

At Step S19, the resizing section 9 processes the image data derived from the image sensor such that the image of the photo-electrically converted area is enlarged to a size in accordance with the size of the display screen, e.g. to be displayed in the entire screen. Specifically, when data of the image of the first range is derived from the image sensor 2, the image of the first range is magnified to the size in accordance with the size of the display screen with the ratio of magnification being determined by the zoom ratio calculating section in accordance with the size of the first range and the size of the screen. When data of the image of the second range is derived from the image sensor 2, the image of the second range is magnified to the size in accordance with the size of the display screen with the ratio of magnification being determined by the zoom ratio calculating section in accordance with the size of the second range and the size of the screen.

The data of the magnified image is outputted to the second image data memory 10 to be stored therein at Step S20. At Step 21, the image display 11 displays the image in accordance with the image data stored in the second image data memory 10.

The process from Step S11 through S21 is conducted for each frame of the picture taking or every several frames of the picture taking. When the process at Step S21 is completed, the flow returns to Step S11 from which processes following thereto are conducted again.

The picture taking device of the second embodiment is provided with the unexpected object recognizing section 12 and the vehicle speed control section 13 to recognize an unexpected object in the front scene and control the speed of the automobile in accordance with the recognition. The present invention is not limited thereto. As an modification, the picture taking device may not be provided with the unexpected object recognizing section 12 and the vehicle speed control section 13. In other word, the functions of recognition of an unexpected object and vehicle speed control are not essential to the device. In that case, the process from Step 16 through Step S18 may be dispensed with so that the image due to the data stored in the first image data memory 5 is magnified at Step S19 after the data of the image detected by the image sensor 2 is stored by the first image data memory 5.

The picture taking device of the first embodiment described before may be modified to be provided with the unexpected object recognizing section 12 and the vehicle speed control section 13 to recognize an unexpected object in the front scene and control the speed of the automobile in accordance with the recognition.

According to the second embodiment described above, the image sensor driver 3 drives the image sensor 2 to make the latter output data of the image of the selected area or range so that the time of image processing is reduced and frame rate is improved. As the speed of the automobile increases, the zoom ratio is increased and data of a smaller area of the image are derived from the image sensor 2. Accordingly, as the automobile runs at higher speed, the data size of the derived image data is smaller to require less time for the processing of the data, thereby improving frame rate, i.e. shortening the time per one frame. When the automobile is driven at high speed, it is important for the driver to recognize the state of the front scene as quickly as possible. The second embodiment shortens the processing time and improve frame rate to make the driver quickly recognize the state of the front scene that is changing, thereby enabling the driver to avoid serious accident.

In addition, the unexpected object recognizing section 12 determines whether any unexpected object is at the center of the front scene, i.e. at remote position of the scene on the running path, and the vehicle speed control section 13 decelerates the automobile when any unexpected object is recognized. Thus, the automobile is driven at a lower speed to avoid serious accident when any unexpected object is on the remote portion of the running path.

Third Embodiment

Figure 6:
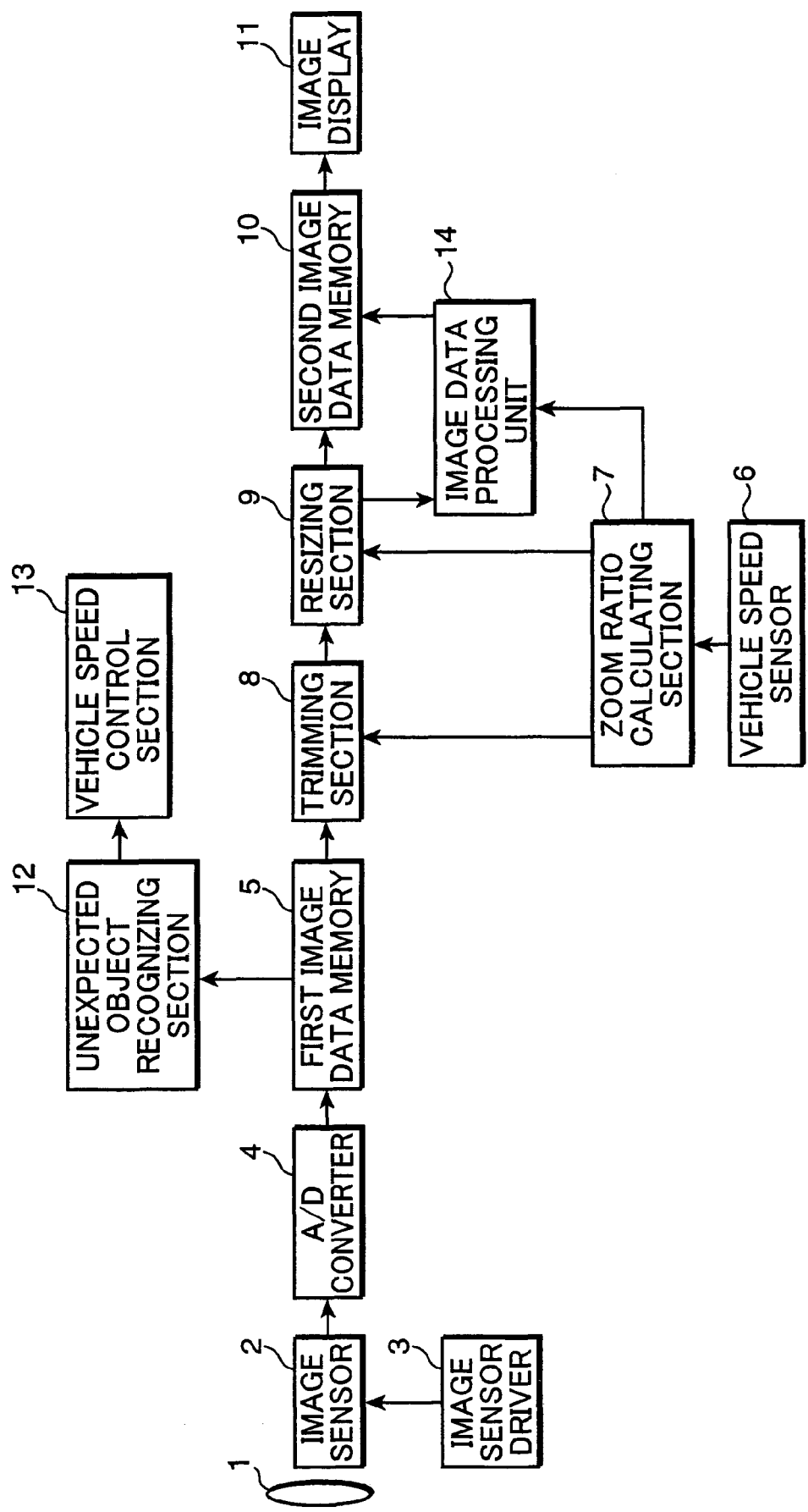
FIG. 6 is a block diagram showing a composition of a picture-taking device according to a third embodiment of the present invention.
Figure 7:
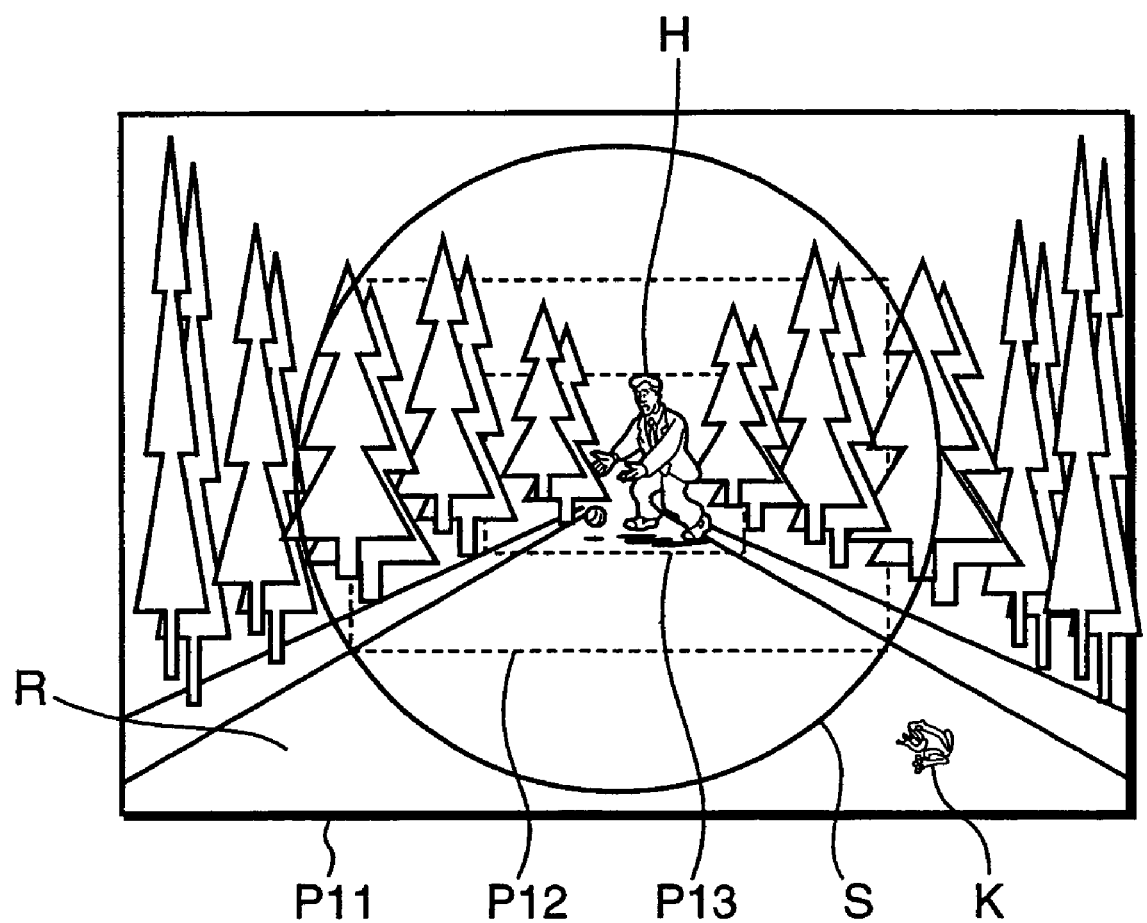
FIG. 7 schematically illustrates an example of a picture taken through a fovea-weighed distortion lens.
Figure 8:
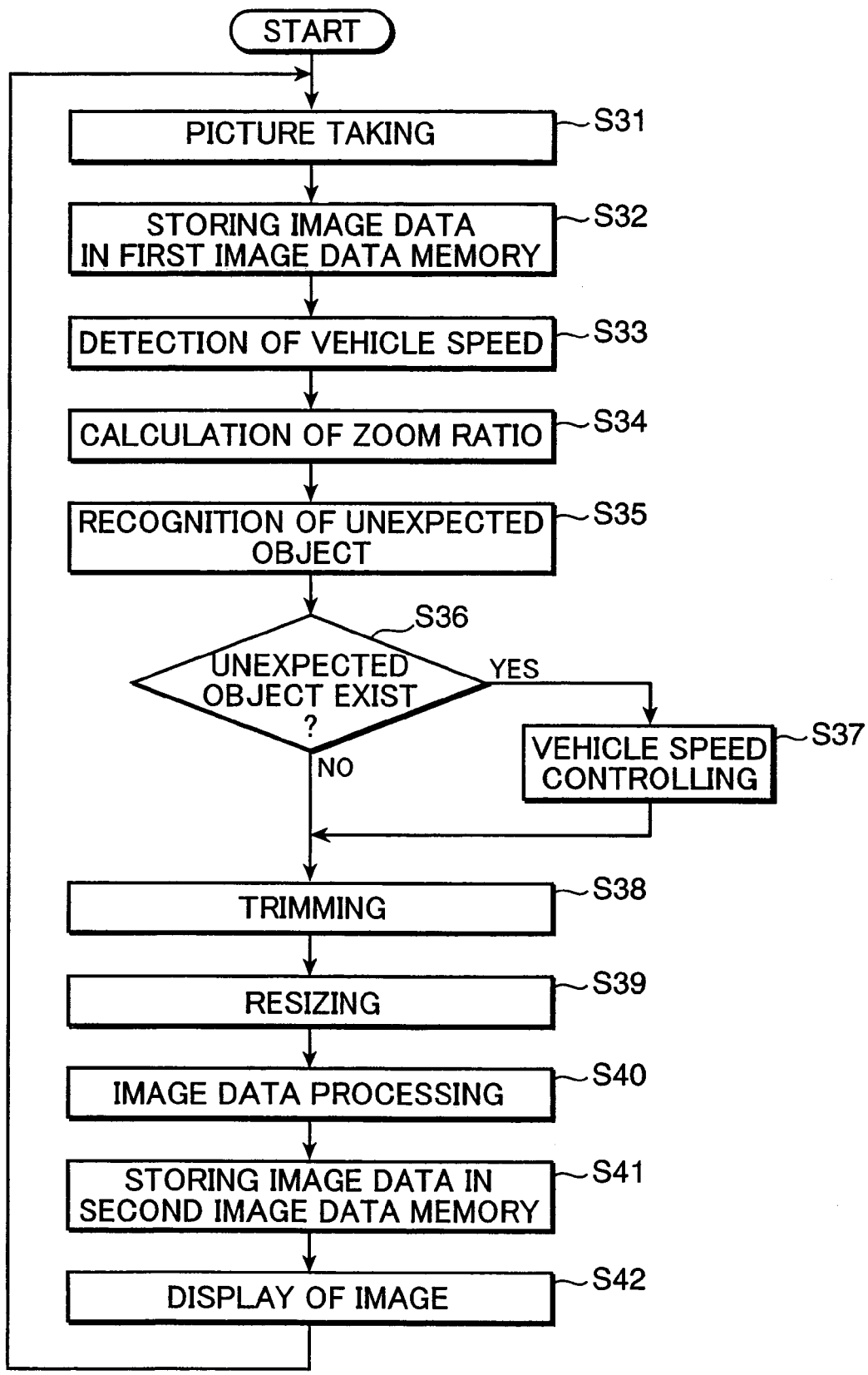
FIG. 8 is a flow chart showing an exemplary operation of the picture-taking device shown in FIG. 6.

Explanation will be made about a picture taking device according to a third embodiment of the present invention with reference to FIGS. 6 through 8. FIG. 6 is a block diagram showing a composition of a picture-taking device according to a third embodiment of the present invention. FIG. 7 schematically illustrates an example of a picture taken through a distortion lens. FIG. 8 is a flow chart showing an exemplary operation of the picture-taking device shown in FIG. 6. As seen in FIG. 6, the picture taking device is composed of an image forming section 1, an image sensor 2, an image sensor driver 3, A/D converter 4, a first image data memory 5, a vehicle speed sensor 6, a zoom ratio calculating section 7, a trimming section 8, a resizing section 9, a second image data memory 10, an image display 11, an unexpected object recognizing section 12, a vehicle speed control section 13 and an image data processing section 14.

The picture taking device according to the third embodiment is substantially the same in composition as the first embodiment but modified in some points. Accordingly, the third embodiment will be described, with the portions of the third embodiment different from the first embodiment being focused. In FIGS. 6 through 8, the same or like reference numerals are used for the parts or members which are the same or correspond to the parts or components shown in FIGS. 1 through 3.

The image forming section 1 includes a distortion lens having an optical characteristic similar to that of a human eye which has a highest visual power in the central portion of the retina called as a fovea centralis or central pit, with the visual power decreasing rapidly towards the periphery of the retina. In other words, the visual power of the human eye is highest at the central portion of the viewing field and decreases rapidly as the measured portion is away from the central portion. The distortion lens is designed to form an image with the largest height of image at the central portion of the image and with the height of the image being lower in the peripheral portion of the image. The height of image here means the height of an image of an object with a given height and located at a given distance from the lens e.g. at 2 m.

The image of the scene in front of the automobile is formed by the distortion lens on the image plane of the image sensor 2 which is disposed behind the image forming section 1. In the image formed on the image plane, an object in the central portion is enlarged while the object in the peripheral portion is contracted. The image formed by the distortion lens is distorted as the location of the image changing from the central portion to the peripheral portion, since the height of image or magnification of image is different at the central and peripheral portions of the image. The image data processing section 14 processes the image data outputted from the resizing section 9 to remove the distortion of the image formed by the distortion lens.

FIG. 7 illustrates an exemplary image of the front scene formed by the distortion lens. As seen in FIG. 7, an unexpected object H is at a remote position on the running path in front of the automobile. The image shown in FIG. 7 is an entire image P11 formed by the image forming section 1 on the image plane. The area designated by P12 is a first area which is selected when the speed of the automobile is within the first range. The area designated by P13 is a second area which is selected when the speed of the automobile is within the second range. The image in the encircled area in FIG. 7 has been enlarged by the distortion lens, while the image outside of the encircled area has been contracted by the distortion lens. It is to be noted that FIG. 7 schematically illustrate, in some simplified form, the image formed by the distortion lens. The actual image formed by the distortion lens does not have a clear boundary between the enlarged area and the contacted area, but the height of the formed image changes gradually from the center of the image where the image has been magnified, to the periphery of the image where the image has been contracted. When the image of the front scene is formed by the distortion lens, an object H at the center, i.e. at remote distance, is enlarged since the image of the object is within the area S where the image is enlarged. On the other hand, the image of an object K residing close to the automobile is contacted since the image is in the area where the image is contracted.

The trimming section 8 selects the first area P12 when the vehicle speed detected by the vehicle speed sensor 6 is within the first range and the zoom ratio calculating section 7 determines the first zoom ratio in accordance with the output of the vehicle speed sensor 6. The image of the first area selected by the trimming section 8 is enlarged by the resizing section 9 to be displayed in the entire screen of the image display. The trimming section 8 selects the second area P12 when the vehicle speed detected by the vehicle speed sensor 6 is within the second range and the zoom ratio calculating section 7 determines the second zoom ratio in accordance with the output of the vehicle speed sensor 6. The image of the second area selected by the trimming section 8 is enlarged by the resizing section 9 to be displayed in the entire screen of the image display.

As seen in FIG. 7, the image of the remote object is enlarged more when the image is formed by the distortion lens than when the image is formed by a fixed focus lens as shown in FIG. 2.

Next, explanation will be made about the operation of the picture taking device of the third embodiment with reference to FIG. 8 which is a flow chart showing the operation.

Figure 3:
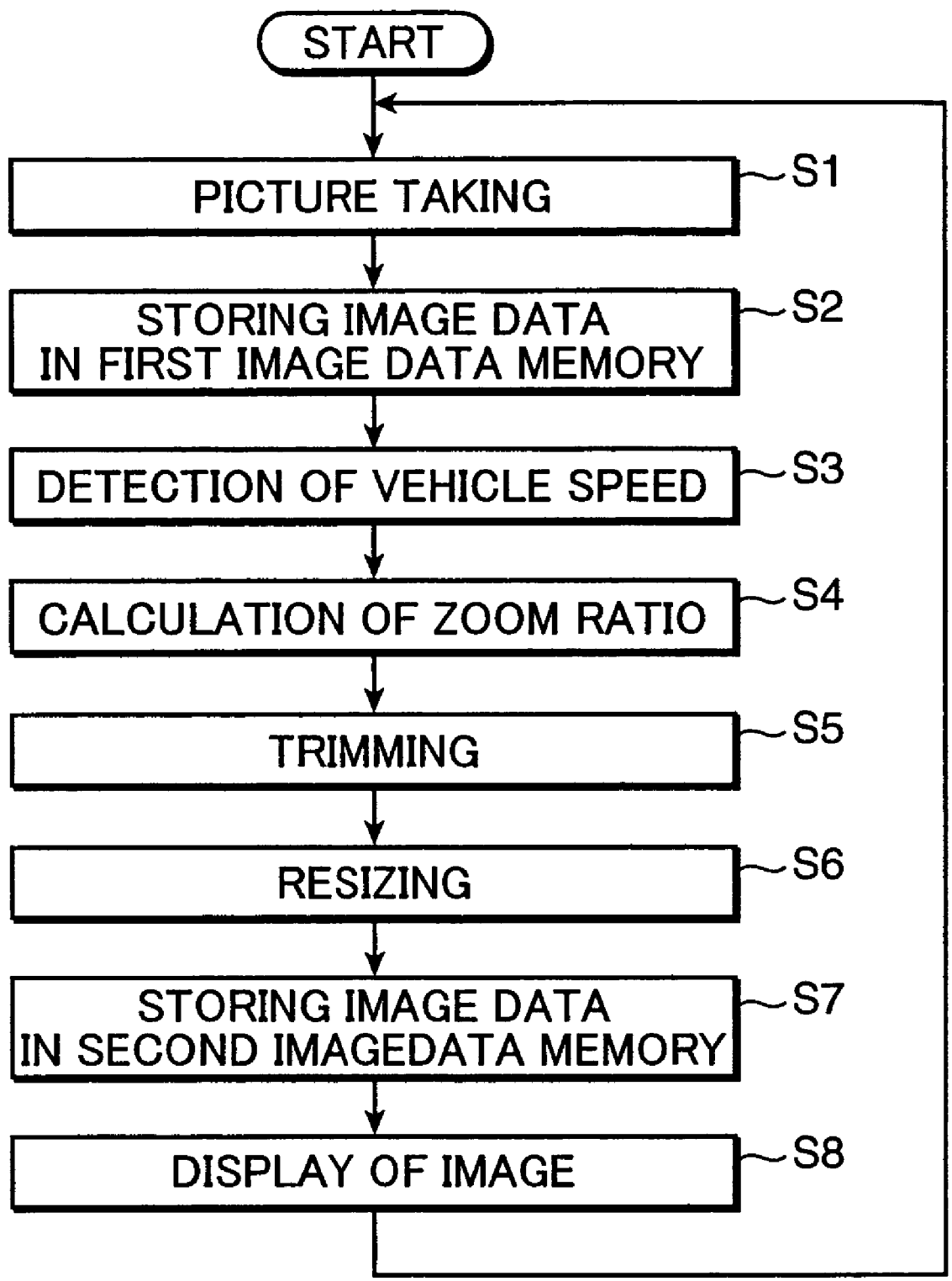
FIG. 3 is a flow chart showing an exemplary operation of the picture-taking device shown in FIG. 1.

The process from Step S31 through S34 shown in FIG. 8 is the same as the process from S1 through S4 of the first embodiment shown in FIG. 3. The process of Steps S38 and S39 is same as the process of the Steps S5 and S6. The process of Steps S41 and S42 is same as the process of the Steps S7 and S8. The process from Step S35 through S37 shown in FIG. 8 is the same as the process from S16 through S28 of the second embodiment shown in FIG. 5. Accordingly, reference is made to the foregoing description for the processes that are the same as those of the first and second embodiments for the simplicity of description. In the following, explanation will be made about a process at Step S40 that is not conducted in the first and second embodiments.

At Step S40, the image data processing section 14 processes the image data outputted from the resizing section 9 to remove the distortion in the image of the picture taken through the distortion lens.

The process from Step S31 through S42 is conducted for each frame of the picture taking or every several frames of the picture taking. When the process at Step S42 is completed, the flow returns to Step S31 from which process following thereto is conducted again.

The process from Step S31 through S42 is conducted for each frame of the picture taking or every several frames of the picture taking. When the process at Step S42 is completed, the flow returns to Step S31 from which the process following thereto is conducted again.

The picture taking device of the third embodiment is provided with the unexpected object recognizing section 12 and the vehicle speed control section 13 to recognize an unexpected object in the front scene and control the speed of the automobile in accordance with the recognition. The present invention is not limited thereto. As a modification, the picture taking device may not be provided with the unexpected object recognizing section 12 and the vehicle speed control section 13. In that case, the process from Step 35 through Step S37 may be dispensed with so that the image of the data stored in the first image data memory 5 is trimmed at Step 38 after the zoom ratio is determined by the zoom ratio calculating section 7 at Step S34.

Further, the picture taking device of the third embodiment is provided with an image data processing unit 14 to remove distortion in the image taken by the distortion lens. Such an image data processing unit 14 is not essential to the present invention but may be dispensed with not to conduct the process of removing the distortion from the image taken by the distortion lens. This is because the image taken by the distortion lens is comparatively less distorted in its central area and recognizable image can be obtained when the image at the central area is enlarged, with the peripheral portion of the original image being trimmed. In this case, the process at Step S40 shown in FIG. 8 is removed so that the data of the image enlarged by the resizing section 9 at Step S39 is stored in the second image data memory 10 at Step S41.

According to the third embodiment as described above, the image forming section 1 includes the distortion lens forming an image at higher magnification in the central area of the image and at lower magnification or higher contraction in the periphery of the image. In addition, the trimming section 8 trims the image taken by the distortion lens to select the area of the image in accordance with the zoom ratio determined by the zoom ratio calculating section 7, with the selected area including the image of the central area in its central portion. The image of the selected area is radially enlarged by the resizing section 9 to a size in compliance with the size of the display screen to be displayed by the display section 11 on the display screen in the enlarged form. As the image of the central portion formed by the distortion lens at higher magnification is enlarged by the resizing section 9, the driver can surely recognize, by looking at the enlarged image, the state of the remote scene which it is difficult for the driver to recognize by his/her naked eyes. Recognizing, without fail, the remote scene in the direction in which the automobile is driven, the driver can take measure to avoid accident beforehand.

Fourth Embodiment

Figure 9:
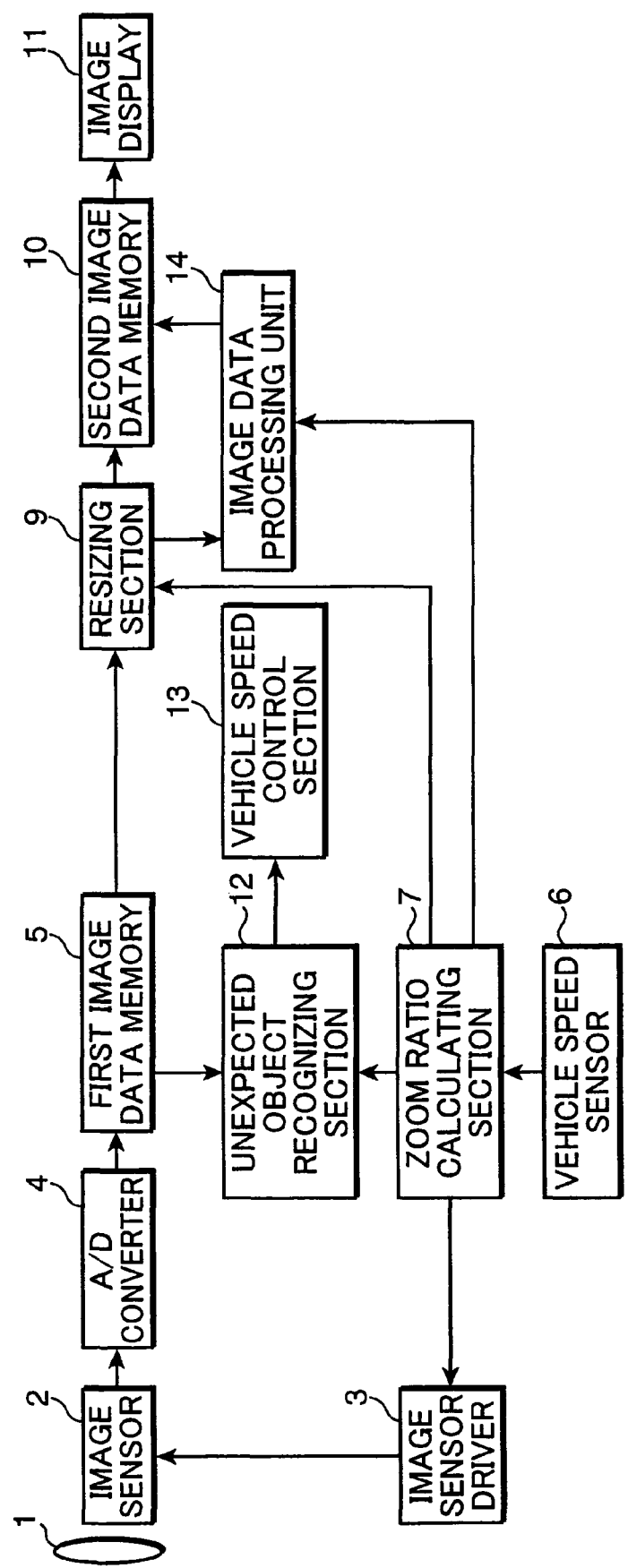
FIG. 9 is a block diagram showing a composition of a picture-taking device according to a fourth embodiment of the present invention.
Figure 10:
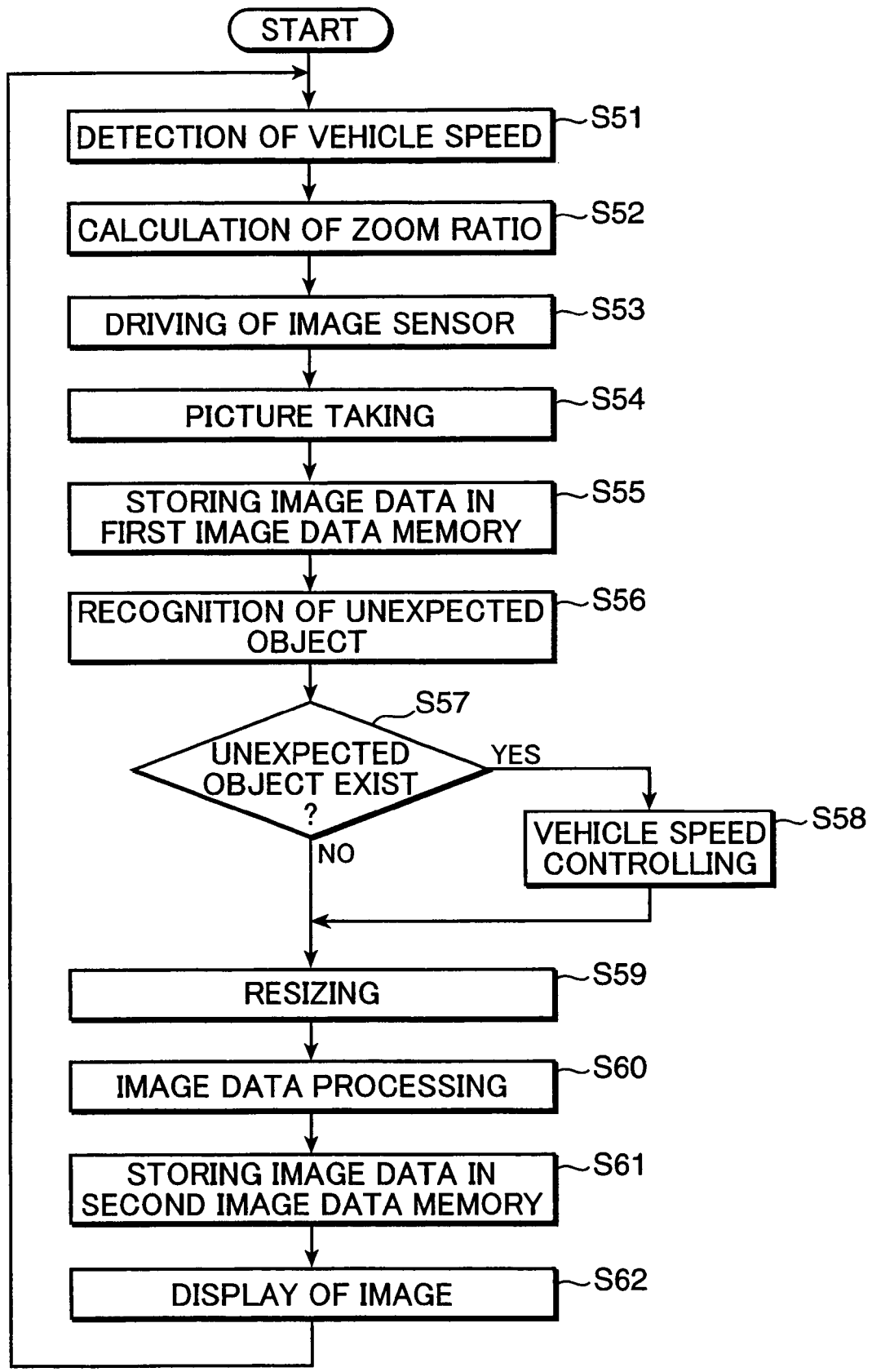
FIG. 10 is a flow chart showing an exemplary operation of the picture-taking device shown in FIG. 9.

Explanation will be made about a picture taking device according to a fourth embodiment of the present invention with reference to FIGS. 9 and 10. FIG. 9 is a block diagram showing a composition of a picture-taking device according to the fourth embodiment of the present invention. FIG. 10 is a flow chart showing an exemplary operation of the picture-taking device shown in FIG. 9. As seen in FIG. 9, the picture taking device is composed of an image forming section 1, an image sensor 2, an image sensor driver 3, A/D converter 4, a first image data memory 5, a vehicle speed sensor 6, a zoom ratio calculating section 7, a resizing section 9, a second image data memory 10, an image display 11, an unexpected object recognizing section 12, a vehicle speed control section 13 and an image data processing section 14.

The picture taking device according to the fourth embodiment has substantially the same composition in part as that of the second embodiment shown in FIG. 4 and in other part as that of the third embodiment shown in FIG. 6. Accordingly, reference should be made to the description of the second and third embodiment with regard to the composition of the fourth embodiment of which description is omitted.

Next, explanation will be made about the operation of the picture taking device of the fourth embodiment shown in FIG. 9. FIG. 10 is a flowchart showing an exemplary operation of the picture taking device of the fourth embodiment.

The process from Step S51 through S59 shown in FIG. 10 is the same as the process from Step S11 through S19 shown in FIG. 5. The process of Steps S61 and S62 shown in FIG. 10 is same as the process of Steps S20 and S21 shown in FIG. 5. The process at Step S60 shown in FIG. 10 is the same as the process at Step S40 shown in FIG. 8. Accordingly, reference should be made to the description of the preceding embodiments with respect to the operation of the fourth embodiment.

The process from Step S51 through S62 is conducted for each frame of the picture taking or every several frames of the picture taking. When the process at Step S62 is completed, the flow returns to Step S51 from which the process following thereto is conducted again.

The picture taking device of the fourth embodiment is provided with the unexpected object recognizing section 12 and the vehicle speed control section 13 to recognize an unexpected object in the front scene and control the speed of the automobile in accordance with the recognition. The present invention is not limited thereto. As an modification, the picture taking device may not be provided with the unexpected object recognizing section 12 and the vehicle speed control section 13. In that case, the process from Step S56 through Step S58 may be dispensed with so that the image of the data stored in the first image data memory 5 is enlarged at Step S59 after the image taken by the image sensor 2 at Step S59 is stored in the first image data memory 5.

Further, the picture taking device of the fourth embodiment is provided with an image data processing unit 14 to remove distortion in the image taken by the distortion lens. Such an image data processing unit 14 is not essential to the present invention but may be dispensed with not to conduct the process of removing the distortion from the image taken by the distortion lens. This is because the image taken by the distortion lens is comparatively less distorted in its central area and recognizable image can be obtained when the image at the central area is enlarged, with the peripheral portion of the original image being trimmed. In this case, the process at Step S60 shown in FIG. 10 is removed so that the data of the image enlarged by the resizing section 9 at Step S59 is stored in the second image data memory 10 at Step S61.

According to the fourth embodiment described above, the image forming section 1 includes the distortion lens designed to form an image with high magnification or height of image at the central portion of the image and with low magnification or small height of image in the peripheral portion of the image. The image sensor 2 is driven by the image sensor driver 3 such that the area of the image sensor 2 to be photoelectrically converted is limited to the central area or area including the central area in accordance with the zoom ratio determined by the zoom ratio calculating section 7. The resizing section 9 enlarges the image of the limited area to be displayed on the display screen in an enlarged form, with the limited area including the image of the central area taken with high magnification by means of the distortion lens. The driver can surely recognize, by looking at the enlarged image, the state of the remote scene which it is difficult for the driver to recognize by his/her naked eyes. Recognizing without fail the remote scene in the direction in which the automobile is driven, the driver can take countermeasure to avoid accident beforehand.

Fifth Embodiment

Figure 11:
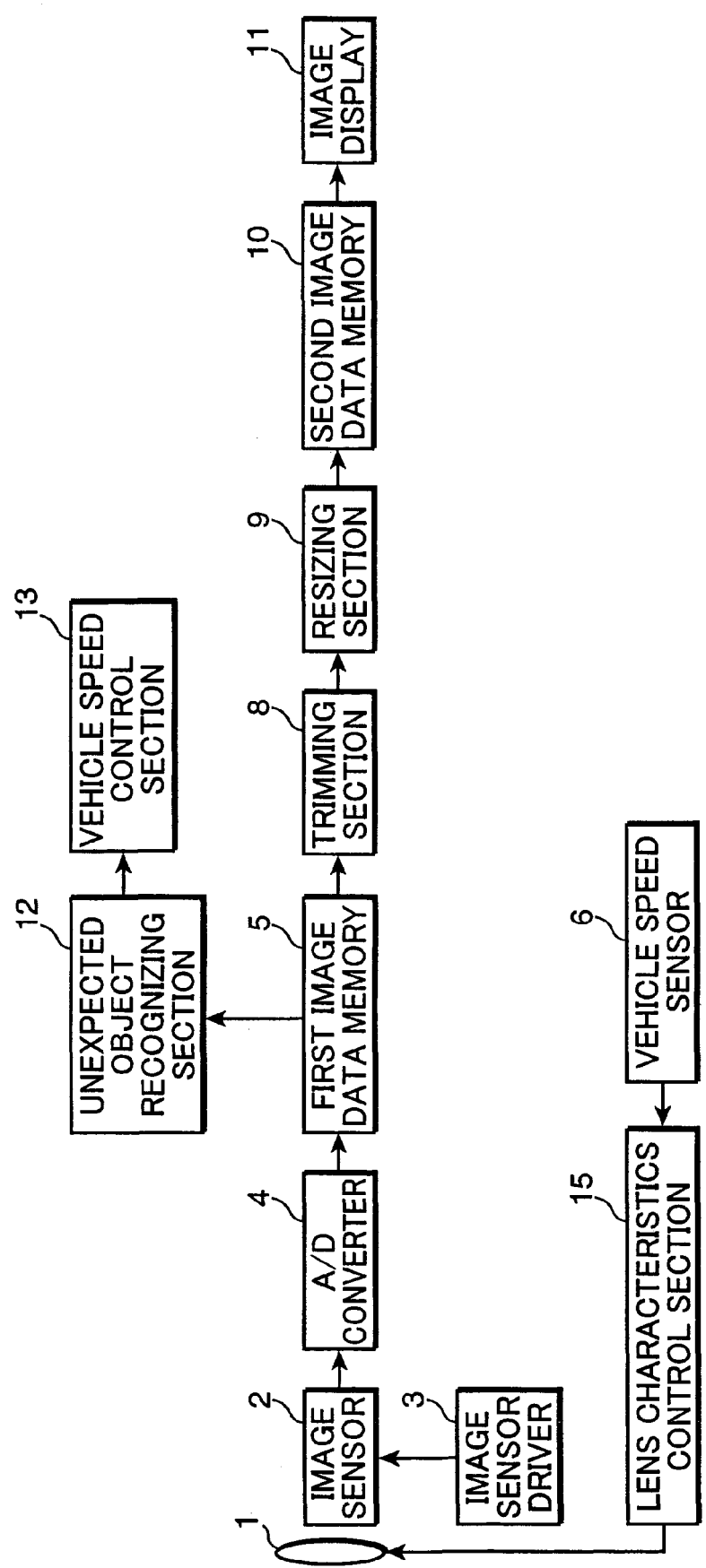
FIG. 11 is a block diagram showing a composition of a picture-taking device according to a fifth embodiment of the present invention.

Explanation will be made about a picture taking device according to a fifth embodiment of the present invention with reference to FIGS. 11 through 15. FIG. 11 is a block diagram showing a composition of a picture-taking device according to a fifth embodiment of the present invention. As seen in FIG. 11, the picture taking device is composed of an image forming section 1, an image sensor 2, an image sensor driver 3, A/D converter 4, a first image data memory 5, a vehicle speed sensor 6, a trimming section 8, a resizing section 9, a second image data memory 10, an image display 11, an unexpected object recognizing section 12, a vehicle speed control section 13 and a lens characteristic control section 15. The picture taking device according to the fifth embodiment is substantially the same in composition as the first embodiment but modified in some points. Accordingly, the fifth embodiment will be described, with the portions of the fifth embodiment different from those of the first embodiment being focused.

The lens characteristic control section 15 controls the characteristic of the lens of the image forming section 1 in accordance with the speed of the automobile detected by the vehicle speed sensor 6. The distortion lens is generally composed of a plurality of lens components and its characteristic is changed by changing relative distance or distances of the lens components.

Figure 12:
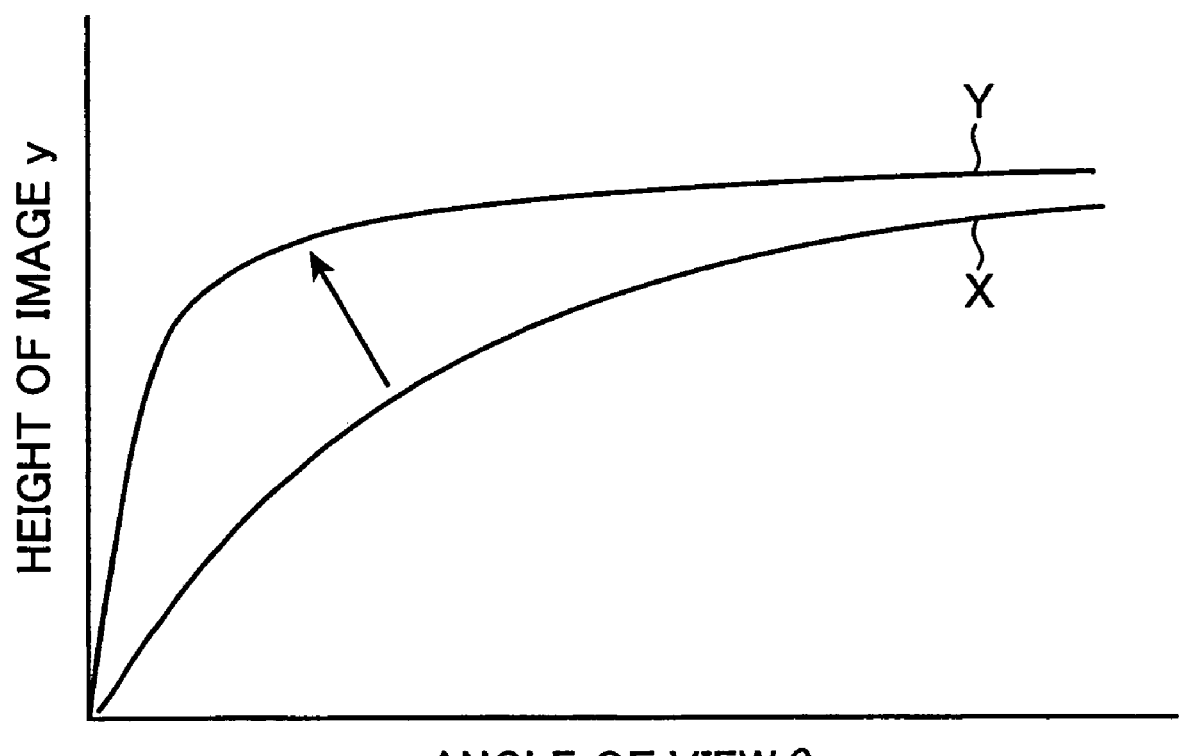
FIG. 12 is a diagram showing the characteristics of the fovea-weighed distortion lens.

With reference to FIG. 12 showing the characteristics of the lens, the abscissa shows the angle of view θ of the lens, while the ordinate shows the height of image y of an object of a given height and located at a given distance, e.g. at 2 m from the lens. The distortion lens shows a characteristic wherein the height of image y linearly changes with the angle of view θ while the angle of view θ is small. In other words, the height of image y changes greatly per unit change of the angle of view θ in the range where the angle of view θ is small. In the range where the angle of view θ is large, the height of image y changes nonlinearly, with the amount of change of the height of image per unit change of the angle of view θ becomes smaller as the angle of view θ increases and finally saturates to a constant value. Accordingly, when the size and pitch of the pixels of the image sensor is constant, the resolution is high while the angle of view θ is small, and the resolution becomes lower as the angle of view θ increases.

In the fifth embodiment, when the speed of the automobile shifts from the first range to the second range, the characteristic of the distortion lens is changed to the one wherein the height of image y changes greatly per the unit change of the angle of view θ while the angle of view θ is small.

In FIG. 12, the characteristic curve X shows the characteristic of the lens when the speed of the automobile is within the first range. The characteristic curve Y shows the characteristic of the lens when the speed of the automobile is within the second range. As seen in FIG. 12, the characteristic curve X is substantially linear, with the rate of change of the height of image per unit change of the angle of view θ decreasing gradually with the increase of the angle of view θ. The characteristic curve Y is substantially linear while the angle of view θ is small, with the height of image changing greatly per unit change of the angle of view θ. In the range where the angle of view θ is large, the characteristic curve Y is nonlinear, with the rate of change of the height of image per unit change of the angle of view θ decreasing gradually with the increase of the angle of view θ and the height of image y finally saturating to an appropriately constant value. The lens characteristic control section 15 controls the lens such that the characteristic of the lens changes from the one shown by the curve X to the one shown by curve Y when the speed of the automobile shifts from a first range speed to a second range speed. With this arrangement, as the speed of the automobile increases, the height of image or the magnification ratio becomes larger in the area where the angle of view θ is small, thereby enlarging greatly the image in the central area.

Figure 13:
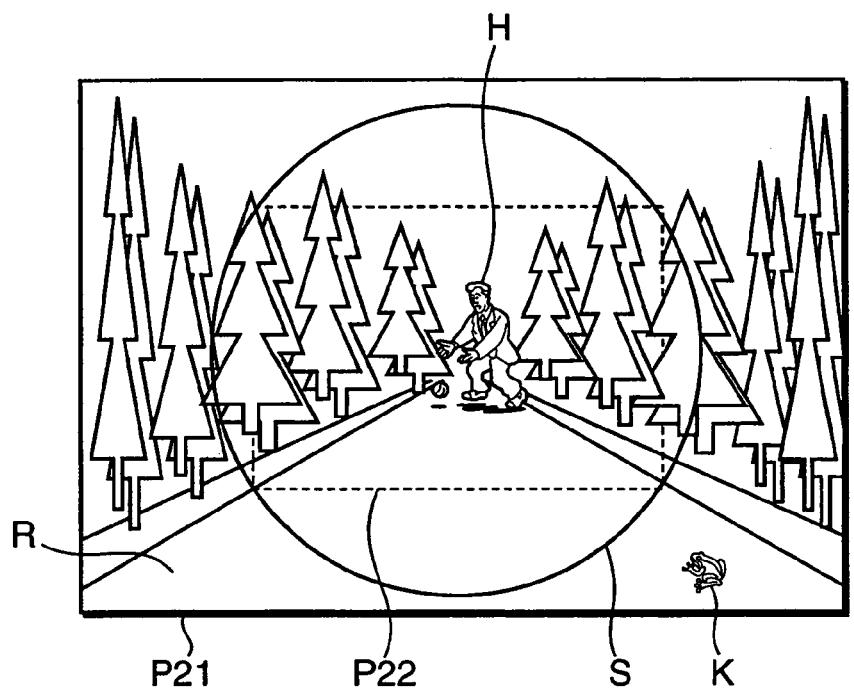
FIG. 13 schematically illustrates an example of a picture taken at a first speed of a vehicle.
Figure 14:
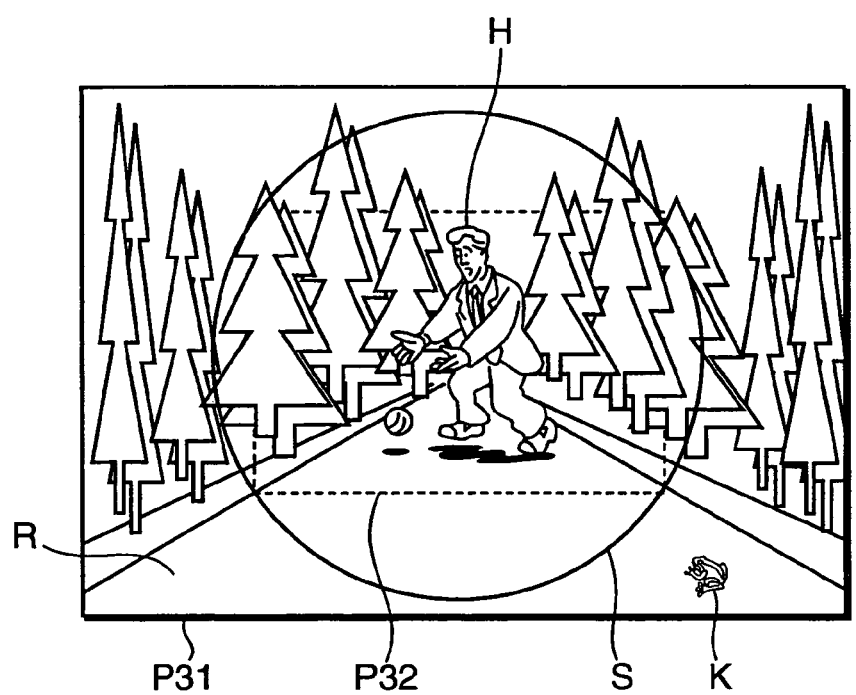
FIG. 14 schematically illustrates an example of a picture taken at a second speed of a vehicle.

FIG. 13 schematically illustrates an exemplary image formed by the distortion lens when the speed of the automobile is within the first range. FIG. 14 schematically illustrates an exemplary image formed by the distortion lens when the speed of the automobile is within the second range. Both FIGS. 13 and 14 show a scene in which an unexpected object H exists on the road in front of the automobile which is running on the road R. The image shown in FIG. 13 is an entire image P21 formed by the image forming section 1 on the image plane. The area designated by P22 is a first area which is selected when the speed of the automobile is within the first range. The image shown in FIG. 14 is an entire image P31 formed by the image forming section 1 on the image plane. The area designated by P32 is a second area which is selected when the speed of the automobile is within the second range. The image in the encircled area in FIGS. 13 and 14, has been enlarged by the distortion lens, as was described in detail with reference to FIG. 7.

As shown in FIGS. 13 and 14, the object H existing at a remote position is displayed in larger form than the object K existing close to the automobile when picture of the front scene is taken by means of the distortion lens. When the characteristic of the distortion lens is changed from the one shown by the curve X to the one shown the curve Y wherein the rate of the change of the height of image per unit change of the angle of view θ is large in the range of small angle of view, the object H at remote position is displayed in larger form than the image of the object H shown in FIG. 13.

When the speed of the automobile determined by the vehicle speed sensor 6 is within the first range and the zoom ratio determined by the zoom ratio calculating section 7 is the first magnification ratio, the trimming section 8 selects the first area P 22. (see FIG. 13) The image of the area P22 selected by the trimming section 8 is enlarged by the resizing section 9 to a size displayed in the entire area of the display screen of the image display 11. When the speed of the automobile determined by the vehicle speed sensor 6 is within the second range and the zoom ratio determined by the zoom ratio calculating section 7 is the second magnification ratio, the trimming section 8 selects the second area P32. (see FIG. 14) The image of the area P32 selected by the trimming section 8 is enlarged by the resizing section 9 to a size displayed in the entire area of the display screen of the image display 11.

Thus, when the automobile is running at a speed within the range which is higher than the speed within the first range, the characteristic of the distortion lens of the image forming section 1 is changed such that the rate or amount of change of the height of image y per unit change of the angle of view θ is large in the area of small angle of view θ. Accordingly, even if the area of the same size is selected by the trimming section both when the speed of the automobile is within the first range and when the speed of the automobile is within the second range, the image in the central portion is displayed in larger form when the speed of the automobile is within the second range than when the speed of the automobile is within the first range.

Next, explanation will be made about the operation of the picture taking device according to the fifth embodiment with reference to FIG. 15 which is a flowchart showing an example of the operation.

Figure 15:
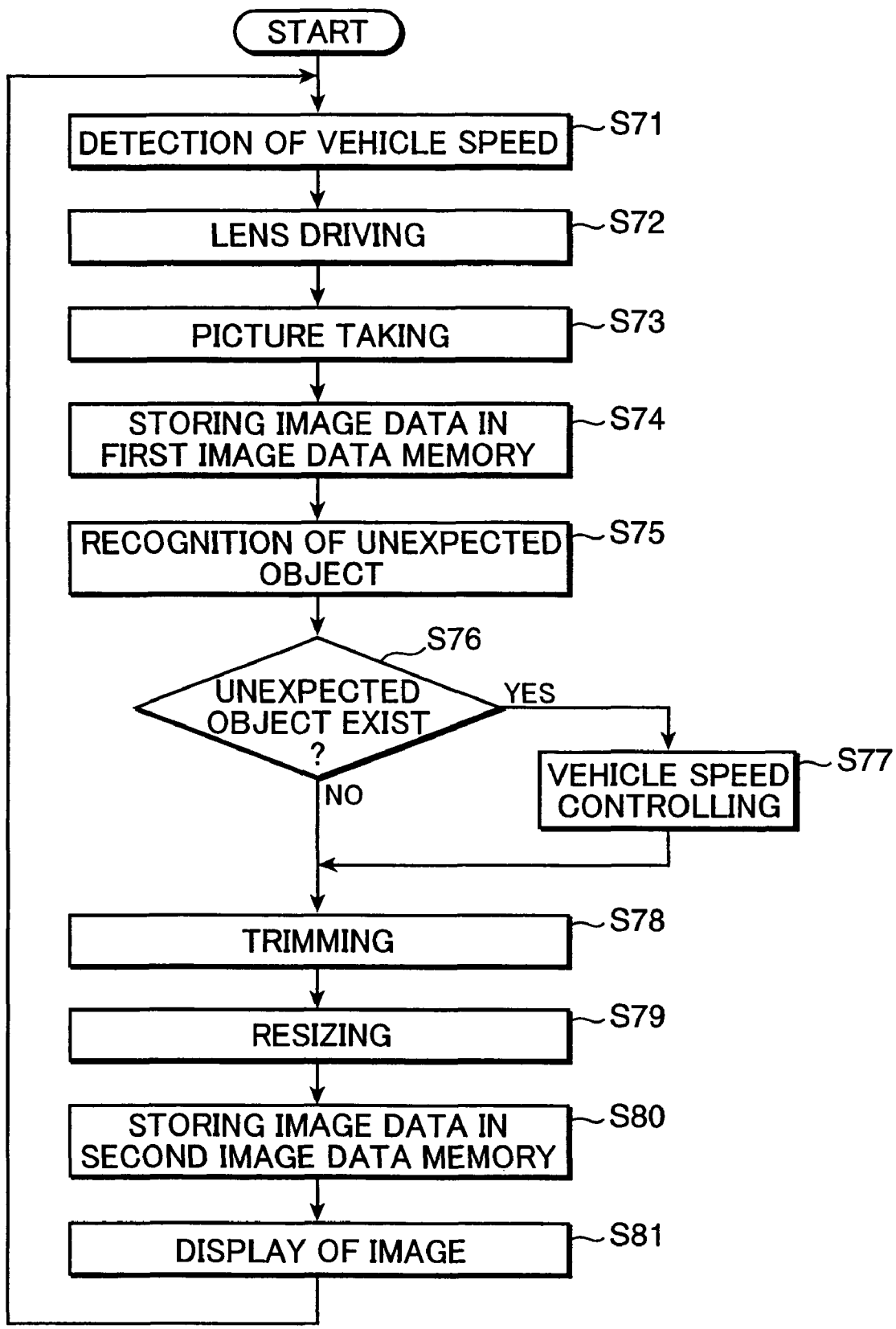
FIG. 15 a flow chart showing an exemplary operation of the picture-taking device shown in FIG. 11.

The process at Step S71 shown in FIG. 15 is same with the process at Step S11 shown in FIG. 5. The process from Step S73 through S77 is same as the process from S54 through S58 shown in FIG. 10. The process from Step S78 through Step S81 is same as the process from Step S5 through S8. Description is avoided of the processes that are same as any processes of the preceding embodiments. Accordingly, description will be made about the process at Step 72 which is different from any process of the preceding first through fourth embodiments.

At Step S72, the lens characteristic control section 15 controls the characteristics of the distortion lens in accordance with the speed of the automobile detected by the vehicle speed sensor 6. When the speed of the automobile is within the second range, the lens characteristic control section 15 controls the characteristics of the distortion lens to show the characteristic wherein the height of image is large in range of the small angle of view.

The process from Step S71 through S81 is conducted for each frame of the picture taking or every several frames of the picture taking. When the process at Step S81 is completed, the flow returns to Step S71 from which the process following thereto is conducted again.

The picture taking device of the fifth embodiment is provided with the unexpected object recognizing section 12 and the vehicle speed control section 13 to recognize an unexpected object in the front scene and control the speed of the automobile in accordance with the recognition. The present invention is not limited thereto. As an modification, the picture taking device may not be provided with the unexpected object recognizing section 12 and the vehicle speed control section 13. In that case, the process from Step S75 through Step S77 may be dispensed with so that the image of the data stored in the first image data memory 5 is enlarged at Step S77 after the image taken by the image sensor 2 at Step S74 is stored in the first image data memory 5.

Further, although the picture taking device according to the fifth embodiment does not conduct process of removing distortion from the image taken through the distortion lens, the present invention is not limited to that. The fifth embodiment may be modified to make an image data processing unit remove distortion in the image taken through the distortion lens. In this case, after the resizing section 9 enlarge the image at Step S60 in FIG. 15, the image data processing unit conducts a process to remove the distortion in the enlarged image and the second image data memory 10 stores, at Step S80, the data of the enlarged image from which the distortion has been removed.

According to the fifth embodiment, the lens characteristic control section control the characteristic of the distortion lens such that the height of image or magnification of the image formed on the image plane of the image sensor 2 changes in accordance with the speed of the automobile detected by the vehicle speed sensor 6. Accordingly, the image display section displays, in further enlarged form, the image of the remote scene in front of the automobile which it is difficult for the driver to recognize by the naked eyes.

Sixth Embodiment

As the picture taking devices of the embodiments described above are mounted on the automobile, it is likely to occur that the image is blurred by the shaking or vibration of the picture taking device while the automobile is being driven. The effect of the vibration is small when the zoom ratio is low, but the effect of the vibration is significant when the zoom ratio is high. Especially, when the automobile is running at a high speed, the vibration tends to be large. As the picture taking devices according to the embodiments described above are designed to make the zoom ratio high when the automobile runs at a high speed, it is necessary to take countermeasure for removing or reducing the blur due to the shaking or vibration of the picture taking device. The sixth embodiment has such a countermeasure.

Figure 16:
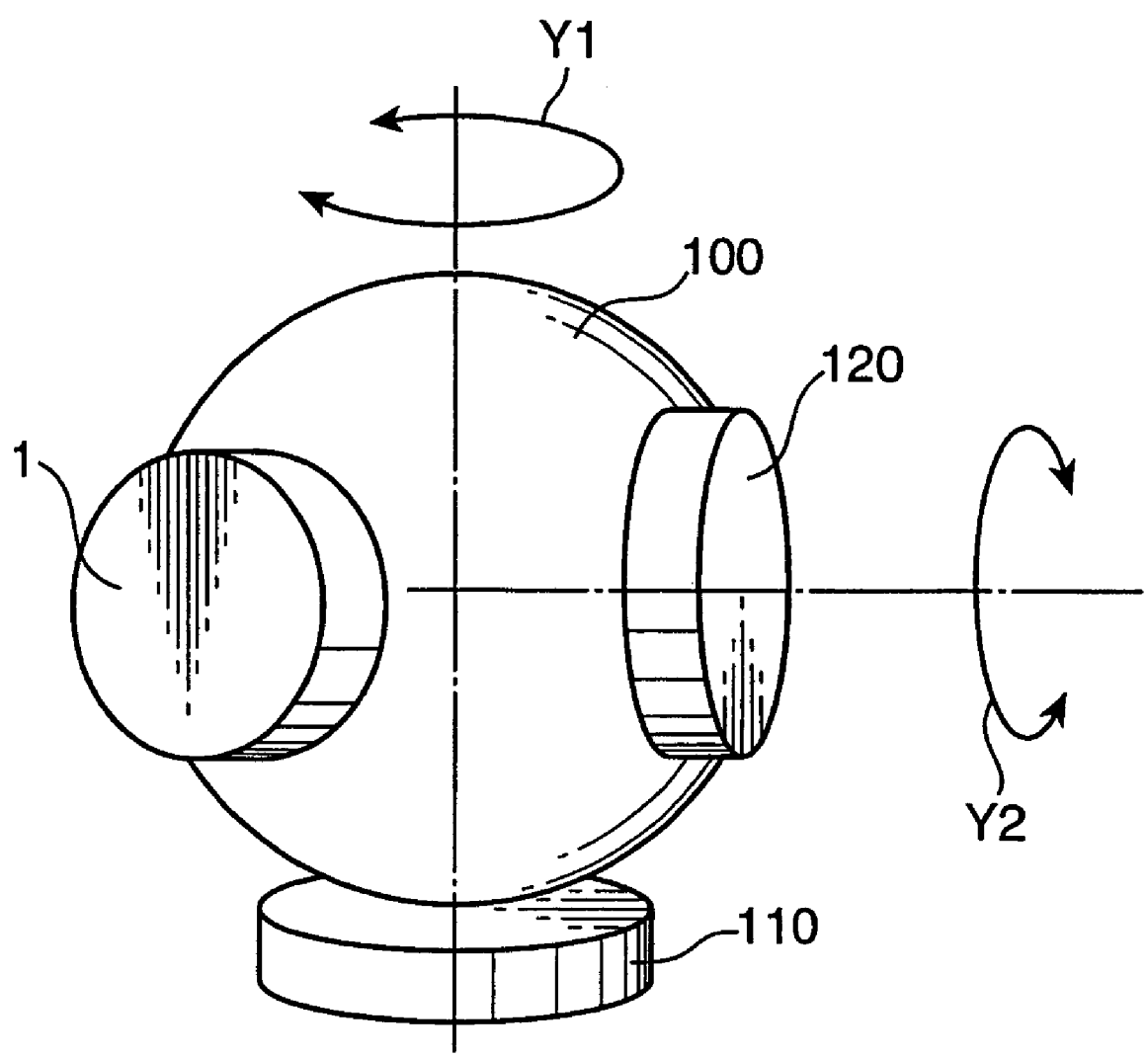
FIG. 16 is a schematic illustration of an outer appearance of a camera equipped on a moving body.

FIG. 16 is a schematic illustration of a camera structure according to the sixth embodiment of the present invention. The camera is composed of a picture taking device 100, a panning actuator 110 and a tilting actuator 120. The picture taking device 100 may be any one of the first through fifth embodiments described above. The panning actuator 110 is for driving the picture taking device 100 in panning direction shown by an arrow Y1 in FIG. 16. The tilting actuator 120 is for driving the picture taking device 100 in panning direction shown by an arrow Y2 in FIG. 16. The picture taking device 100 includes a housing which supports an objective lens working as the image forming section 1.

Figure 17:
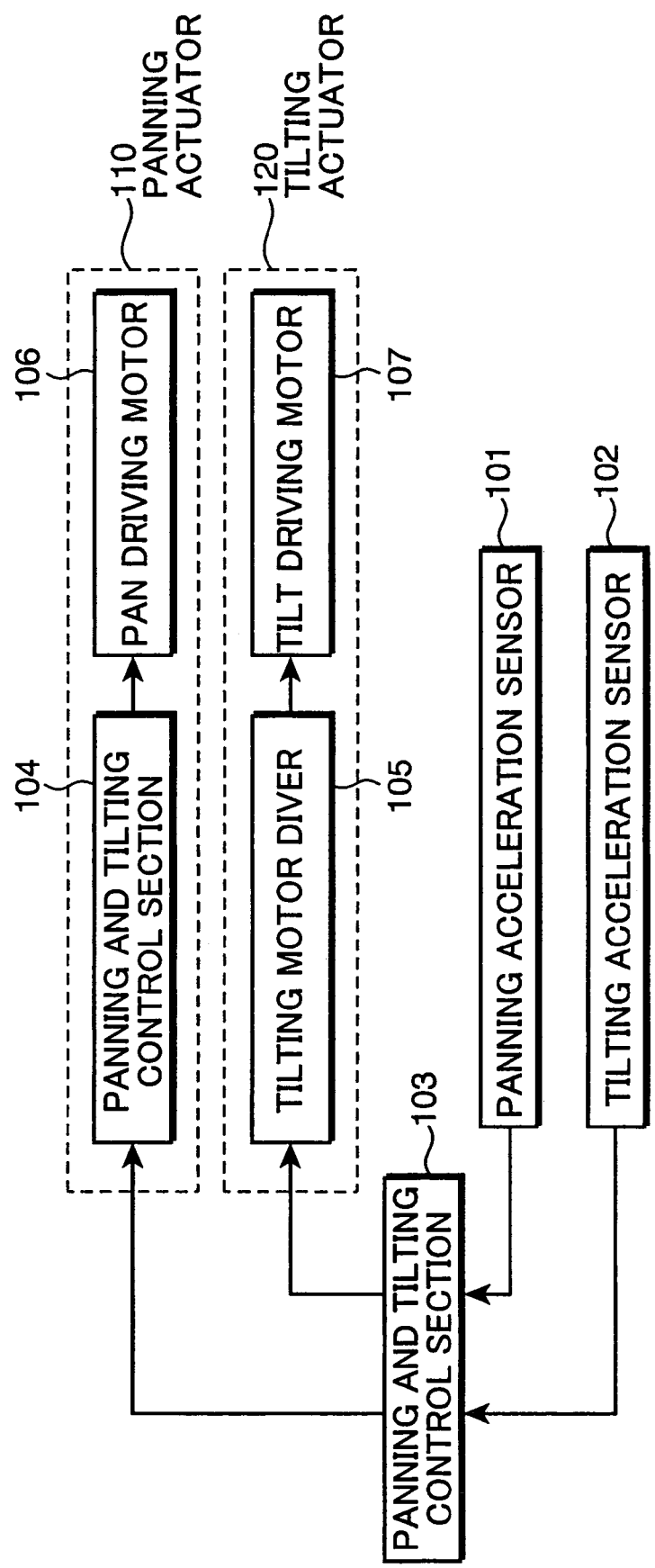
FIG. 17 is a block diagram showing a camera stabilizing system.

FIG. 17 is a block diagram showing the panning and tilting system for the camera As shown in FIG. 17, the system includes a panning acceleration sensor 101, a tilting acceleration sensor 102, a panning and tilting control section 103, a panning motor driver 104, a tilting motor diver 105, a pan driving motor 106 and a tilt driving motor 106. The panning actuator 110 includes the panning motor driver 104 and the pan driving motor 106. The tilting actuator 120 includes the tilting motor driver 105 and the tilt driving motor 107.

The panning acceleration sensor 101 detects the acceleration of the camera housing in the panning direction. The data of the acceleration detected by the panning acceleration sensor 101 is outputted to the panning and tilting control section 103. The tilting acceleration sensor 102 detects the acceleration of the camera housing in the tilting direction. The data of the acceleration detected by the tilting acceleration sensor 102 is outputted to the panning and tilting control section 103.

In accordance with the panning direction acceleration detected by the panning acceleration sensor 101, the panning and tilting control section 103 determines amount of driving of the pan driving motor 106,. i.e. how much the pan driving motor 106 is to be driven, and outputs a control signal for driving the pan driving motor 106 for the determined amount of driving.

In accordance with the tilting direction acceleration detected by the tilting acceleration sensor 102, the panning and tilting control section 103 determines amount of driving of the tilt driving motor 107, i.e. how much the tilt driving motor 107 is to be driven, and outputs a control signal for driving the tilt driving motor 107 for the determined amount of driving.

The panning motor driver 104 drives the pan driving motor 106 in accordance with the control signal fed from the panning and tilting control section 103. The tilting motor driver 105 drives the tilt driving motor 107 in accordance with the control signal fed from the panning and tilting control section 103.

The pan driving motor 106 turns the camera housing clockwise and counterclockwise in panning direction around a vertical axis of rotation. The tilt driving motor 106 turns the camera housing clockwise and counterclockwise in tilting direction around a horizontal axis of rotation.

According to the sixth embodiment as described above, the picture taking device 100 displays the image of selected area of the scene in front of the automobile in an enlarged form, with the amount of enlargement being determined in accordance with the speed of the automobile. The panning acceleration sensor 101 detects the acceleration of the picture taking device 100 in the panning direction, and the panning and tilting control section 103 determines amount of driving of the pan driving motor 106, which drives the camera housing in the panning direction for an amount determined by the panning and tilting control section 103. The tilting acceleration sensor 102 detects the acceleration of the camera housing in the tilting direction, and the panning and tilting control section 103 determines amount of driving of the tilt driving motor 107, which drives the camera housing in the tilting direction for an amount determined by the panning and tilting control section 103. Accordingly, the camera housing is driven in panning and tilting directions in accordance with the acceleration detected by the panning acceleration sensor 101 and tilting acceleration sensor 102 to offset the vibration or shaking of the camera housing thereby removing or reducing blur of the displayed image. Thus, the image of the scene in the direction in which the automobile is running, is displayed clearly without or less blur, and in an enlarged form.

Having described specific embodiments of our invention, it is believed obvious that our invention is not limited to them but modifications and variations are possible.

For example, in the embodiments described above, the picture taking device 100 is equipped on an automobile. The picture taking device may be equipped on various types of vehicles and vessels, such as, although not limited thereto, an automobile, a train, a tram car, a ship, a boat, an aircraft and a roller coaster.

In the embodiments, the entire picture taking device is equipped on the moving body e.g. the automobile to be seen by a driver, but some parts may be provided at different location. For example, the display 11 may be provided remote from the moving body with the data stored in the second image data memory being transmitted through a wire or wirelessly to the display 11 located remote from the moving body. Other parts or sections also may be provided remote from the moving body, as the case may be, to receive data or signals from their preceding sections through a wire or wirelessly.

From the above-mentioned embodiments is derived various aspects or features of the present invention such as follows:

(1) A monitor device for a moving body comprises an image forming section for forming a two dimensional image of the front scene of the moving body on a image plane; an image sensor for photo-electrically converting the two dimensional image into electric image data; a speed sensor for detecting running speed of the moving body; a speed classifying section for determining which of a first and a second speed range the detected speed belongs, the speed of the second range being higher than that of the first range; a zoom ratio determining section for determining a first zoom ratio when the detected speed is within the first range, and determining a second zoom ratio when the detected speed is within the second range, the second zoom ratio being larger than the first zoom ratio; an image area selecting section for processing the image data to select a first area of the two dimensional image when the first zoom ratio is determined, and select a second area of the two dimensional image when the second zoom ratio is determined, the second area being smaller than the first area; an image enlarging section for processing the image data processed by the image area selecting section to enlarge the image of the selected area with the zoom ratio determined by the zoom ratio determining section; and a display for displaying the image of the area enlarged by the image enlarging section.

According to this aspect of the invention, the zoom ratio and the area of the image to be selected are determined depending on which of the first and second speed zones the detected speed belongs. When the speed is within the higher speed zone, a smaller area of the image is selected and displayed with the image being enlarged with a larger zoom ratio. Thus, when the small area include an image of a far away scene, the image of the far away scene is displayed in an enlarged form to be recognized clearly.

(2) A monitor device for a moving body comprises an image forming section for forming a two dimensional image of the front scene of the moving body on a image plane: an image sensor for photo-electrically converting the two dimensional image into electric image data; a speed sensor for detecting running speed of the moving body; a speed classifying section for determining which of a first and a second speed range the detected speed belongs, the speed of the second range being higher than that of the first range; the zoom ratio determining section for determining a first zoom ratio when the detected speed is within the first range, and determining a second zoom ratio when the detected speed is within the second range, the second zoom ratio being larger than the first zoom ratio; a image sensor driving section for driving the image sensor to photo-electrically convert a first area when the first zoom ratio is determined and convert a second area when the first zoom ratio is determined, the second area being smaller in size than the first area; an image enlarging section for processing the image data processed by the image area selecting section to enlarge the image of the selected area with the zoom ratio determined by the zoom ratio determining section; and a display for displaying the image of the area enlarged by the image enlarging section.

According to this aspect of the invention, the zoom ratio and the area of image to be photo-electrically converted are determined depending on which of the first and second speed zones the detected speed belongs. When the speed is within the higher speed zone, a smaller area of the image is selected and displayed with the image being enlarged with a larger zoom ratio. Thus, when the small area include an image of a far away scene, the image of the far away scene is displayed in an enlarged form to be recognized clearly.

(3) The image forming section may include a specially designed distortion lens which forms an image with its height of image being larger in central area and smaller in peripheral area. Such a distortion lens may be used in the monitor device as described in (1) or (2) such that the smaller area selected or converted includes the central area where the height of image is large. With this arrangement, the optically enlarged image is further enlarged by the image data processing and displayed. Thus, when the small area include an image of a far away scene, the image of the far away scene is displayed in a greatly enlarged form to be recognized clearly.

(4) The image forming section may include a fixed focus lens. A portion of the image formed by the fixed focus lens may be selected by image data processing, or photo-electrically converted, and displayed in an enlarged form.

(5) The monitor device may further comprises an object detecting unit for detecting whether the image data include a data of an image of an unexpected object, and a speed control section for controlling the moving body in accordance with the detection by the object detecting unit. The speed control section may control the moving body to reduce the speed of the moving body when the unexpected object is detected in the image data.

Having described our invention as related to the embodiments shown in the accompanying drawing, it is our intention that the invention be not limited by any of the details of description, unless otherwise specified, but rather be construed broadly within its spirit and scope as set out in the accompanying claims.

What is claimed is:

1. A monitor device for displaying a front scene of a moving body with an image of an actual or imaginary converging point of a lane of a running path for the moving body being at a center of an image frame, comprising:
   an image forming section for forming a two dimensional image of the front scene of the moving body with the image of the actual or imaginary converging point of the lane of the running path for the moving body being at the center of the image frame on a image plane, wherein the image forming section includes a distortion lens having a characteristic of forming an image, with a height of the image being larger in a central area and smaller in a peripheral area so as to allow the central area of the image to have a high resolution;
   an image sensor for photo-electrically converting the two dimensional image into electric image data;
   a speed sensor for detecting a running speed of the moving body;
   a zoom ratio determining section for determining a zoom ratio in accordance with the detected running speed;
   an image sensor driving section for driving the image sensor to change the photo-electrically converted area of the two dimensional image in accordance with the determined zoom ratio;
   an image enlarging section for processing the image data to enlarge the image of the converted area with the zoom ratio determined by the zoom ratio, wherein the image data is obtained by photo-electrically converting only an area determined in accordance with the zoom ratio in an effective image area, and the two dimensional image of the front scene is formed in an entire area of the effective image area in the image sensor; and
   a display for displaying the image of the area enlarged by the image enlarging section.

2. A monitor device according to claim 1 further comprising a lens characteristics control section for controlling the characteristics of the distortion lens such that the height of the image becomes larger as the speed of the moving body increases.

3. A monitor device according to claim 2 wherein the lens characteristics control section controls the characteristics of the distortion lens such that the ratio of changing of the height of image per unit change of angle of view is larger when the speed of the moving body is high.

4. A monitor device according to claim 1 further comprising an image data processing section for processing the image data to correct distortion of the image taken by the distortion lens.

5. A monitor device according to claim 1 further comprising a housing incorporating the image forming section and the image sensor; a tilting acceleration sensor for detecting acceleration in the movement of the housing in the tilting direction; a tilting drive calculating section for calculating amount of driving of the housing to offset the movement of the housing; and a driving section for driving the housing in accordance with the amount of driving calculated by the tilting drive calculating section.

6. A monitor device according to claim 1 further comprising a housing incorporating the image forming section and the image sensor; a panning acceleration sensor for detecting acceleration in the movement of the housing in the panning direction; a panning drive calculating section for calculating amount of driving of the housing to offset the movement of the housing; and a driving section for driving the housing in accordance with the amount of driving calculated by the panning drive calculating section.

7. A monitor device according to claim 1, wherein the speed sensor includes a speed classifying section for determining which of a plurality of speed ranges a detected speed belongs, the zoom ratio determining section determines the zoom ratio in accordance with the determined range, the image area selecting section selects area of the image in accordance with the determined range.

8. A monitor device according to claim 1 further comprising a resizing section for processing the image data of the selected area to enlarge the image to be displayed in entire area of a display screen of the display.

9. A monitor device according to claim 1, further comprising an object detecting unit for detecting whether the image data include a data of an image of an unexpected object, and a speed control section for controlling the moving body in accordance with the detection by the object detecting unit.

10. A monitor device according to claim 9, wherein the speed control section controls the moving body to reduce the speed of the moving body when the unexpected object is detected in the image data.

11. A monitor device according to claim 10, wherein the image enlarging section for processes the image data processed by the image area selecting section to enlarge the image of the selected area radially towards its periphery with its central image remaining at the center.

12. A monitor device according to claim 9 further comprising a lens characteristics control section for controlling the characteristics of the distortion lens such that the height of the image becomes larger as the speed of the moving body increases.

13. A monitor device according to claim 8, wherein the speed sensor includes a speed classifying section for determining which of a plurality of speed ranges a detected speed belongs, the zoom ratio determining section determines the zoom ratio in accordance with the determined range, the image area selecting section selects area of the image in accordance with the determined range, and the monitor device further comprising a resizing section for processing the image data of the selected area to enlarge the image to be displayed in entire area of a display screen of the display.

14. A monitor device according to claim 8, further comprising an object detecting unit for detecting whether the image data include a data of an image of an unexpected object, and a speed control section for controlling the moving body in accordance with the detection by the object detecting unit.

15. A monitor device for displaying a front scene of a moving body with an image of an actual or imaginary converging point of a lane of a running path for the moving body being at a center of an image frame, comprising:

an image forming section for forming a two dimensional image of the front scene of the moving body with the image of the actual or imaginary converging point of the lane of the running path for the moving body being at the center of the image frame on a image plane, wherein the image forming section includes a distortion lens having a characteristic of forming an image, with a height of the image being larger in a central area and smaller in a peripheral area so as to allow the central area of the image to have a high resolution;

an image sensor for photo-electrically converting the two dimensional image into electric image data;

a speed sensor for detecting a running speed of the moving body;

a zoom ratio determining section for determining a zoom ratio in accordance with the detected running speed;

an image sensor driving section for driving the image sensor to change the photo-electrically converted area of the two dimensional image in accordance with the determined zoom ratio;

an image enlarging section for processing the image data to enlarge the image of the converted area with the zoom ratio determined by the zoom ratio, wherein the image data is obtained by photo-electrically converting only an area determined in accordance with the zoom ratio in an effective image area, and the two dimensional image of the front scene is formed in an entire area of the effective image area in the image sensor; and a display for displaying the image of the area enlarged by the image enlarging section, wherein the speed sensor includes a speed classifying section for determining which of a plurality of speed ranges a detected speed belongs, the zoom ratio determining section determines the zoom ratio in accordance with the determined range, the image area selecting section selects area of the image in accordance with the determined range and, wherein the speed classifying section determines which of a first and a second speed ranges the detected speed belongs, the speed of the second range being higher than that of the first range; the zoom ratio determining section determines a first zoom ratio when the detected speed is within the first range, and determines a second zoom ratio when the detected speed is within the second range, the second zoom ratio being larger than the first zoom ratio; and the image area selecting section processes the image data to select a first area of the two dimensional image when the first zoom ratio is determined, and select a second area of the two dimensional image when the second zoom ratio is determined, the second area being smaller than the first area.

* * * * *